(12) United States Patent  
Udipi et al.

(10) Patent No.: US 12,175,802 B2
(45) Date of Patent: Dec. 24, 2024

(54) GENERATION AND MANAGEMENT OF NOTIFICATIONS PROVIDING DATA ASSOCIATED WITH ACTIVITY DETERMINATIONS PERTAINING TO A VEHICLE

(71) Applicant: Microsoft Technology Licensing, LLC, Redmond, WA (US)

(72) Inventors: Rahul Anantha Padmanabha Udipi, Cupertino, CA (US); Andrew Christopher McLeod, Belmont, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 613 days.

(21) Appl. No.: 17/347,939

(22) Filed: Jun. 15, 2021

(65) Prior Publication Data
US 2022/0398872 A1    Dec. 15, 2022

(51) Int. Cl.
G07C 5/00    (2006.01)
G06N 20/00    (2019.01)
(Continued)

(52) U.S. Cl.
CPC ............. G07C 5/008 (2013.01); G06N 20/00 (2019.01); G07C 5/02 (2013.01); H04W 4/48 (2018.02)

(58) Field of Classification Search
CPC ........... G07C 5/008; G07C 5/02; H04W 4/48; G06N 20/00
(Continued)

(56) References Cited

U.S. PATENT DOCUMENTS 8,019,629 B1 * 9/2011 Medina, III ........... G06Q 40/08
  705/4
9,581,461 B1 * 2/2017 Chintakindi ......... G08G 1/0129
(Continued)

FOREIGN PATENT DOCUMENTS

| CN | 112367352 A | 2/2021 |
| JP | 2018120293 A | 8/2018 |

OTHER PUBLICATIONS

Rehrl, et al., "Why did a vehicle stop? A methodology for detection and classification of stops in vehicle trajectories", In International Journal of Geographical Information Science, vol. 34, Issue 10, Mar. 23, 2020, pp. 1953-1979.
(Continued)

*Primary Examiner* — Kurt Philip Liethen
*Assistant Examiner* — John D Bailey

(57) ABSTRACT

The present disclosure that relates to automatic generation of activity determinations of a vehicle and generation and provision of notifications thereof. As an example, a trained model is applied that is adapted to execute a contextual analysis of signal data, including activity signal data retrieved from analysis of signals provided by a mobile computing device onboard a vehicle, and generate activity determinations therefrom. Exemplary graphical user interface (GUI) notifications can be automatically generated pertaining to activity determinations of a vehicle (vehicle activity determinations), where the GUI notifications can be automatically provided to one or more users. For instance, a GUI notification is automatically provided to an emergency contact of a driver in real-time (or near real-time) when it is detected that a vehicle has stopped (e.g., on a specific road such as a highway). Additional examples of the present disclosure pertain to an improved GUI for a driving safety application/service.

20 Claims, 8 Drawing Sheets

(51) Int. Cl.
G07C 5/02 (2006.01)
H04W 4/48 (2018.01)

(58) Field of Classification Search
USPC .......................................................... 706/12
See application file for complete search history.

(56) References Cited

U.S. PATENT DOCUMENTS

| | | | | |
|---|---|---|---|---|
| 9,767,625 | B1* | 9/2017 | Snyder | G07C 5/008 |
| 9,773,281 | B1* | 9/2017 | Hanson | H04W 4/023 |
| 9,818,239 | B2* | 11/2017 | Pal | G08B 25/001 |
| 9,832,241 | B1* | 11/2017 | Hayward | G01C 21/3667 |
| 9,955,319 | B2* | 4/2018 | Matus | H04W 4/023 |
| 10,163,346 | B2 | 12/2018 | Neumann | |
| 10,560,823 | B1* | 2/2020 | Chen | G08G 1/127 |
| 10,906,535 | B2 | 2/2021 | Solmaz et al. | |
| 10,990,105 | B2* | 4/2021 | Chen | G06V 20/588 |
| 10,991,244 | B2* | 4/2021 | Chen | G08G 1/0133 |
| 11,120,647 | B1* | 9/2021 | Brandmaier | G08G 1/166 |
| 11,132,848 | B2* | 9/2021 | Kunkel | G07C 5/0808 |
| 11,189,168 | B2* | 11/2021 | Chun | G08G 1/207 |
| 11,352,013 | B1* | 6/2022 | Srinivasan | B60W 40/04 |
| 2003/0060977 | A1* | 3/2003 | Jijina | G08G 1/096861 |
| | | | | 701/414 |
| 2008/0082261 | A1* | 4/2008 | Tengler | G01C 21/26 |
| | | | | 701/414 |
| 2012/0123806 | A1* | 5/2012 | Schumann, Jr. | G06Q 40/08 |
| | | | | 705/4 |
| 2013/0069802 | A1* | 3/2013 | Foghel | G08G 1/205 |
| | | | | 340/436 |
| 2014/0062725 | A1* | 3/2014 | Maston | G08G 1/0141 |
| | | | | 340/905 |
| 2014/0074402 | A1* | 3/2014 | Hassib | G01C 21/3461 |
| | | | | 701/533 |
| 2014/0266789 | A1* | 9/2014 | Matus | H04Q 9/00 |
| | | | | 340/870.07 |
| 2015/0127388 | A1* | 5/2015 | Oldham | G06Q 40/08 |
| | | | | 705/4 |
| 2016/0086285 | A1* | 3/2016 | Jordan Peters | G08G 1/096827 |
| | | | | 701/484 |
| 2016/0104328 | A1* | 4/2016 | Chen | G07C 5/0858 |
| | | | | 701/414 |
| 2016/0171521 | A1* | 6/2016 | Ramirez | G08G 1/096838 |
| | | | | 701/409 |
| 2016/0171621 | A1* | 6/2016 | Bogovich | G08G 1/096827 |
| | | | | 705/4 |
| 2017/0164158 | A1* | 6/2017 | Watkins | H04W 4/027 |
| 2018/0090005 | A1* | 3/2018 | Philosof | G08G 1/164 |
| 2018/0322775 | A1* | 11/2018 | Chase | G05D 1/0297 |
| 2019/0331763 | A1* | 10/2019 | Abari | G01S 13/931 |
| 2019/0371182 | A1 | 12/2019 | England | |
| 2020/0162868 | A1* | 5/2020 | Isaac | G08G 1/205 |
| 2020/0209864 | A1 | 7/2020 | Chen | |
| 2020/0334980 | A1 | 10/2020 | Ludwig | |
| 2021/0097314 | A1* | 4/2021 | Scanlon | G06V 20/584 |
| 2021/0377141 | A1* | 12/2021 | Priyadarsini | G05B 23/024 |
| 2022/0089181 | A1* | 3/2022 | Gross | G07C 5/0841 |
| 2022/0197306 | A1* | 6/2022 | Cella | G06N 3/088 |

OTHER PUBLICATIONS

"International Search Report and Written Opinion Issued in PCT Application No. PCT/US22/028869", Mailed Date: Aug. 16, 2022, 12 Pages.

* cited by examiner

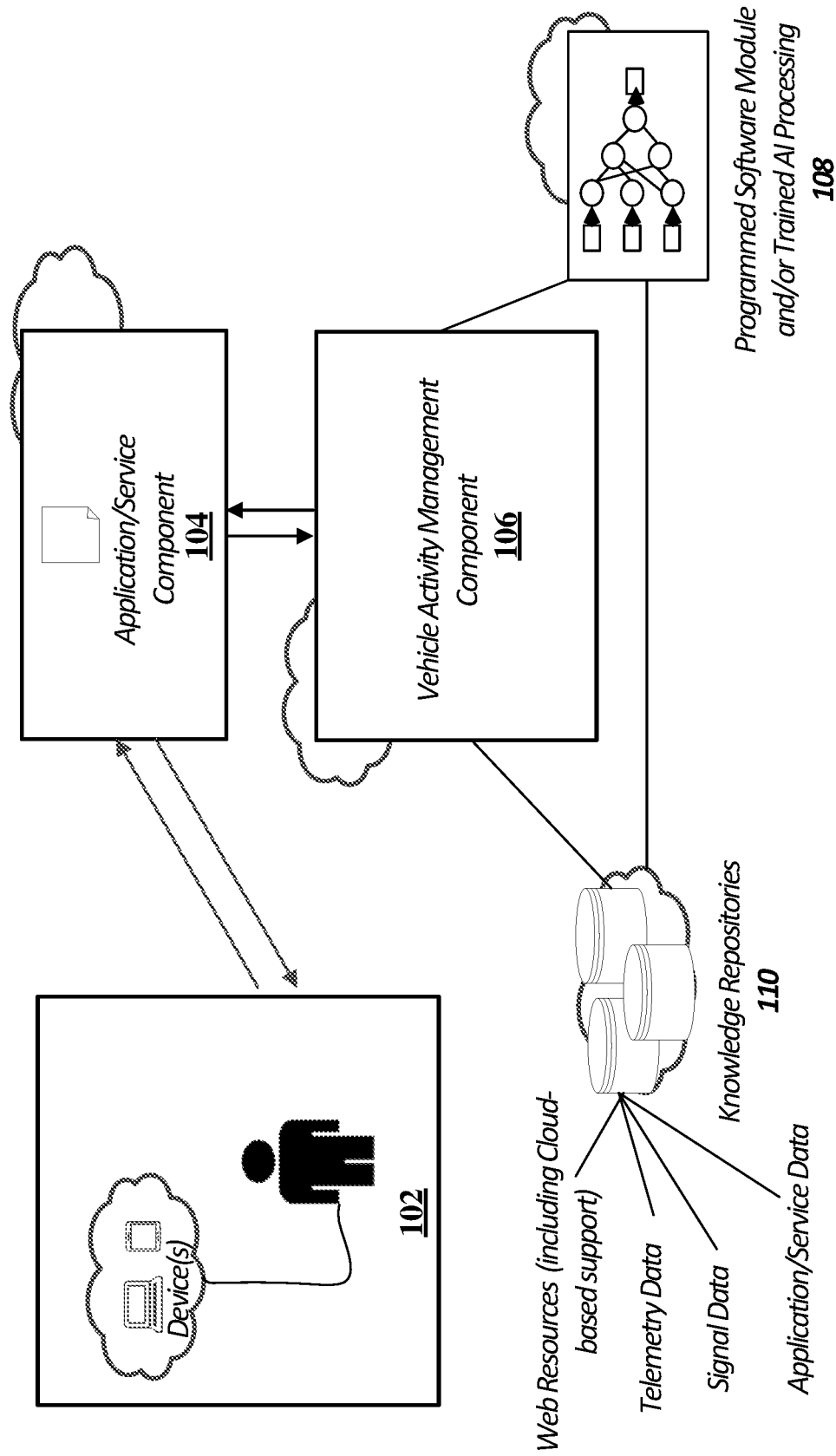

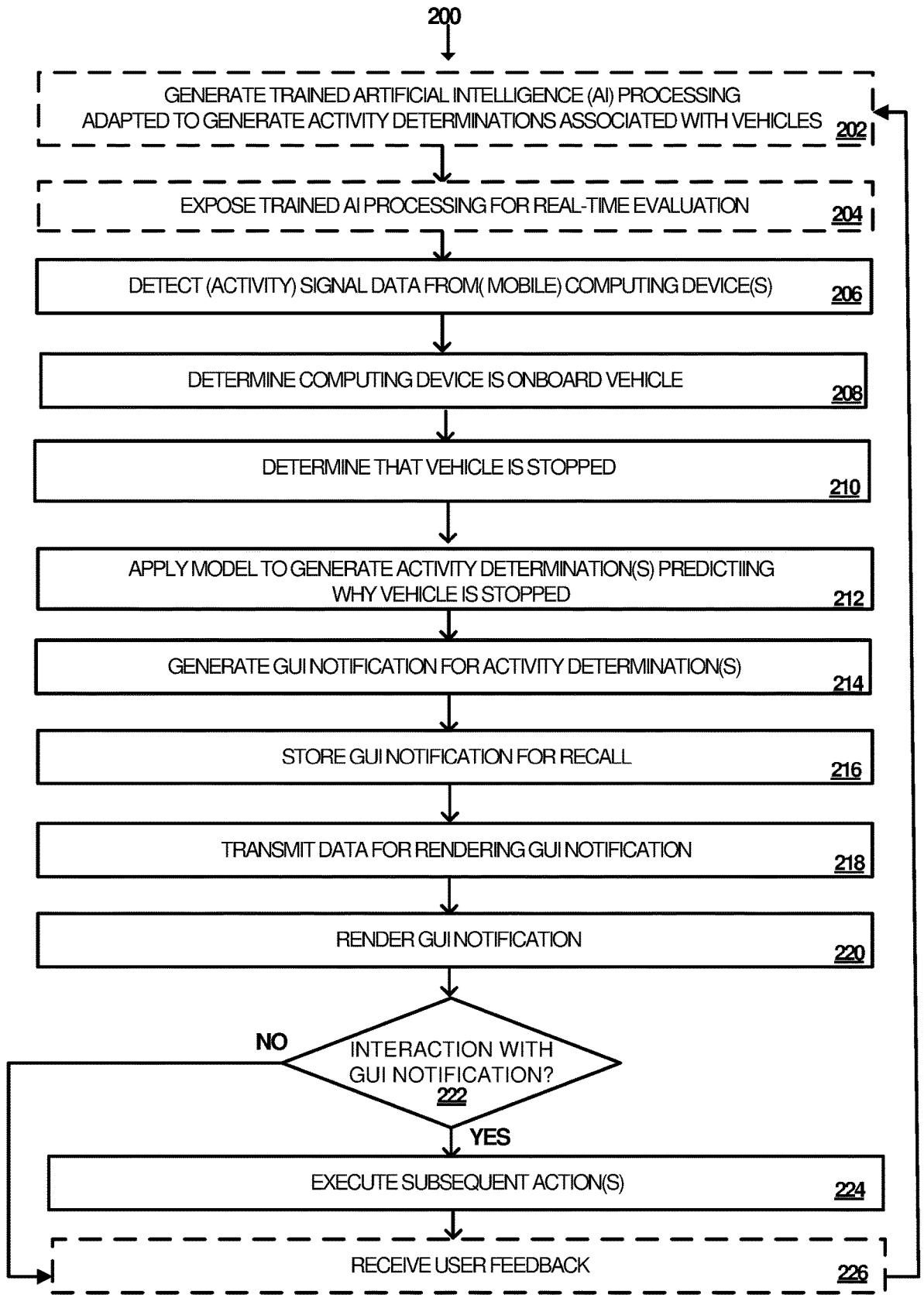

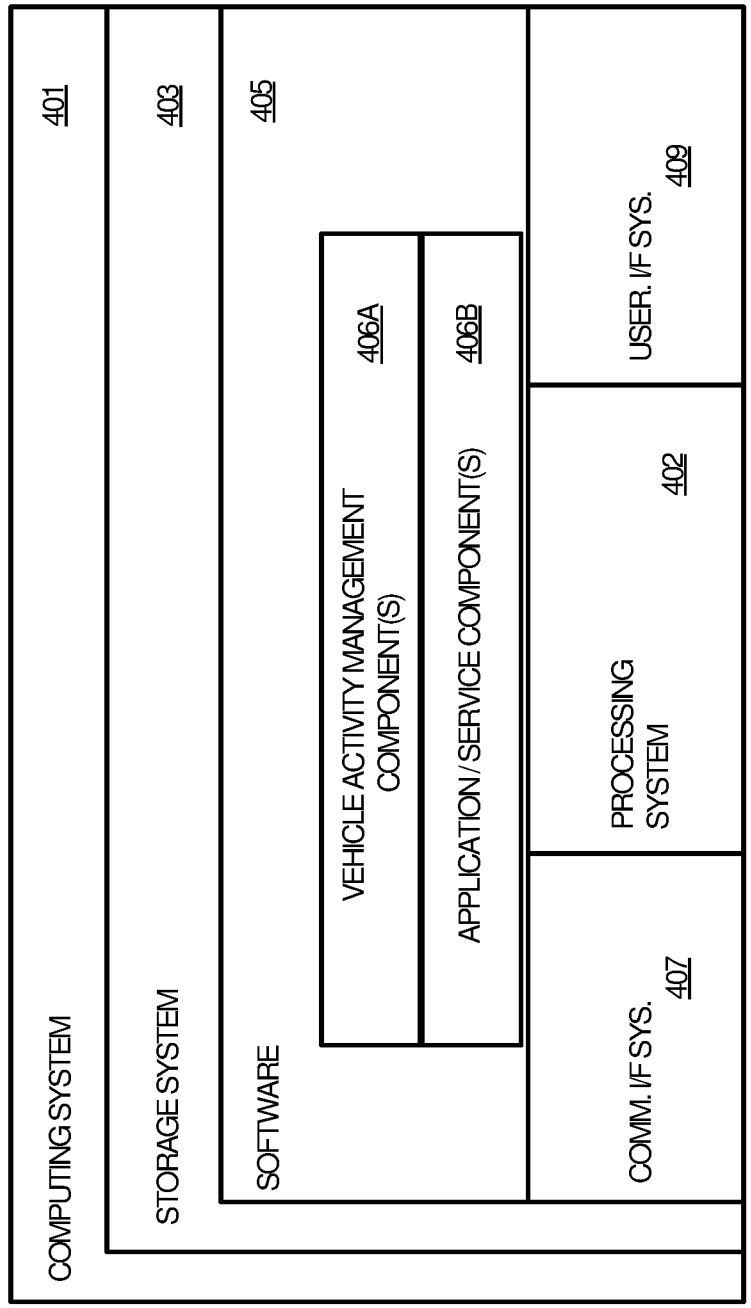

GENERATION AND MANAGEMENT OF NOTIFICATIONS PROVIDING DATA ASSOCIATED WITH ACTIVITY DETERMINATIONS PERTAINING TO A VEHICLE

BACKGROUND

Driving safety is a paramount concern which has evolved into the usage of technology to track driving habits and improve driving safety. However, driving safety applications/services are limited with respect to real-time detection of vehicle activity and notifications thereof. For instance, traditional driving safety applications/services focus on historical determinations. However, users often require assistance during real-time situations such as accidents, being pulled over, flat tires, out of gas, etc. This is especially true for new drivers as well as drivers that require assistance to safely operate a vehicle.

As a specific example, parents often worry about the safety of their children as new drivers. New drivers are often unaware of various aspects of a vehicle as well as how to handle stressful situations when vehicle issues arise. Traditionally, there is no way for other users, who are not present in a vehicle, to automatically receive instantaneous notifications about vehicle activity. A new driver may call their parent if they get into an accident (or get ticket), but in some instances drivers may not be able to easily contact their parents or know the contact information for roadside assistance, emergency services, etc. As such, there is room for technical improvement with respect to activity determinations of a vehicle as well as automatic notification thereof.

Furthermore, activity determinations for a vehicle are often predictive. As such, it can be difficult for traditional application/services to generate accurate determinations of vehicle activity just from analyzing a small number of signals. For instance, an application may be able to detect that a vehicle is speeding but not correlate that speeding to another determination such as whether the user was pulled over for speeding. Therefore, there is a technical need to provide a better technical solution to generate more accurate and comprehensive contextual determinations as to vehicle activity.

SUMMARY

For resolution of the above technical problems and other reasons, there is a technical need for the present disclosure that relates to automatic generation of activity determinations of a vehicle and generation and provision of notifications thereof. As an example, a trained model (e.g., trained artificial intelligence (AI) model) is applied that is adapted to execute a contextual analysis of signal data, including activity signal data retrieved from analysis of signals provided by a mobile computing device onboard a vehicle, and generate activity determinations therefrom. Exemplary graphical user interface (GUI) notifications can be automatically generated pertaining to activity determinations of a vehicle (vehicle activity determinations), where the GUI notifications can be automatically provided to one or more users. For instance, an exemplary GUI notification can be automatically provided to an emergency contact (e.g., parent) of a driver in real-time (or near real-time) when it is detected that a vehicle has stopped (e.g., on a specific road such as a highway). Additional examples of the present disclosure pertain to an improved GUI for a driving safety application/service. For instance, users have control over automatic transmission of GUI notifications as well as access to summary report information pertaining to vehicle activity determinations.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 1 illustrates an exemplary system diagram of components interfacing to enable generation and management of activity determinations of a vehicle and provision of associated GUI notifications, with which aspects of the present disclosure may be practiced.

FIG. 2 illustrates an exemplary method related to generation and management of activity determinations of a vehicle and provision of associated GUI notifications, with which aspects of the present disclosure may be practiced.

FIG. 4 illustrates a computing system suitable for implementing processing operations described herein related to generation and management of activity determinations of a vehicle and provision of associated GUI notifications, with which aspects of the present disclosure may be practiced.

DETAILED DESCRIPTION

Figure 3A:
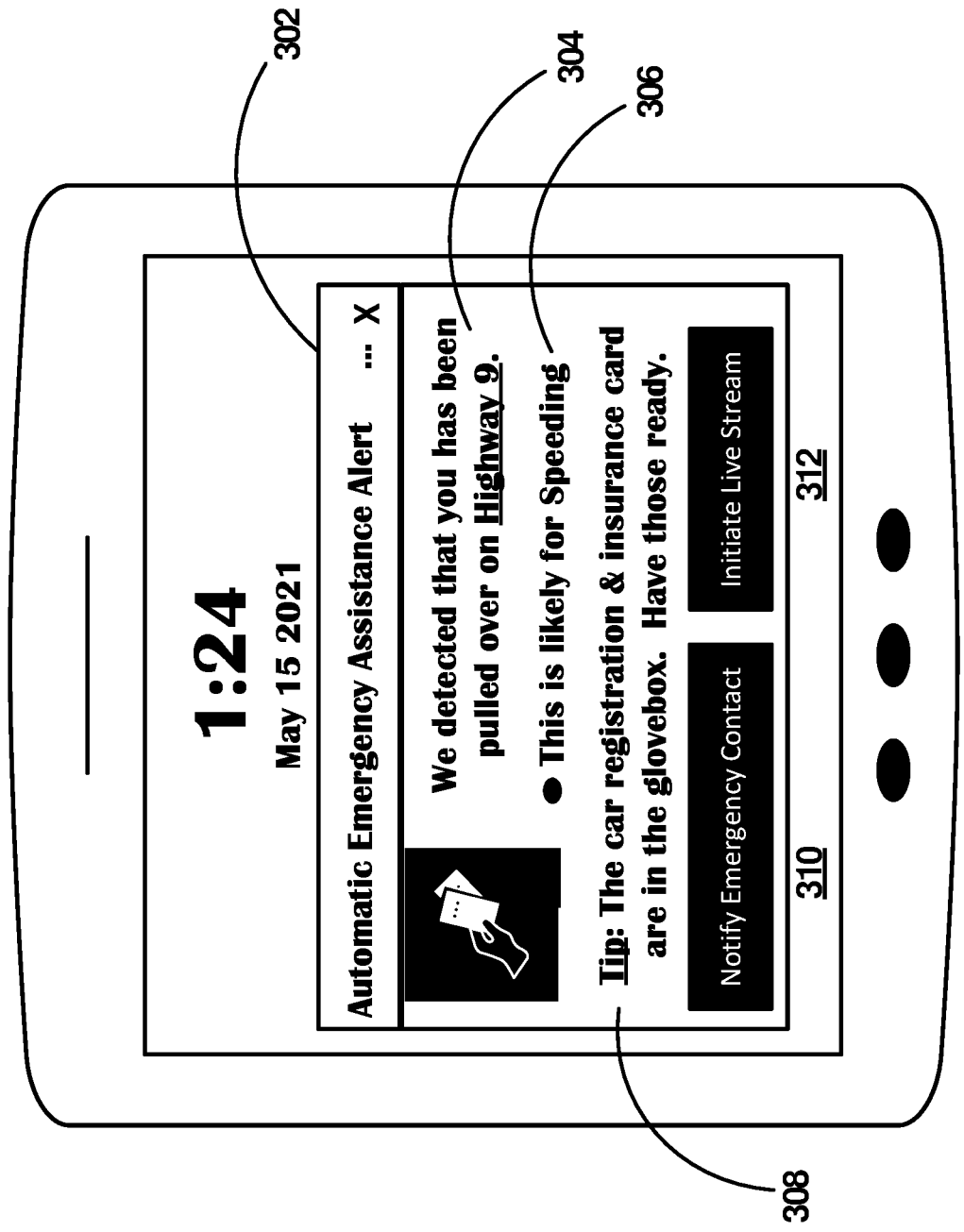
FIGS. 3A-3E illustrate exemplary processing device views associated with user interface examples for improved user interfaces that are used to provide exemplary GUI notifications comprising activity determinations for a vehicle as well as manage relevant contextual data, with which aspects of the present disclosure may be practiced.

As identified above, there is a technical need for the present disclosure that relates to automatic generation of activity determinations of a vehicle and generation and provision of notifications thereof. As an example, a trained model (e.g., trained AI model) is applied that is adapted to execute a contextual analysis of signal data, including activity signal data retrieved from analysis of signals provided by a mobile computing device onboard a vehicle, and generate activity determinations therefrom. Activity determinations of a vehicle (vehicle activity determinations) can be any type of determination associated with operation of a vehicle. A vehicle, as described herein, pertains to any means of transportation as known to one skilled in the field of art comprising but not limited to: motor vehicles (e.g., motorcycles, cars, trucks, buses); railed vehicles (e.g., trains, trams); watercrafts (e.g., ships, boats), amphibious vehicles (e.g., propelled vehicles, hovercraft), aircraft (e.g., airplanes, helicopters); spacecrafts; bicycles, wagons, scooters, boards, among other examples. As one example, a vehicle referenced herein is a motor vehicle, where driving analytics pertaining to a motor vehicle is determined to derive driving safety determinations and analytics.

In further examples, the present disclosure pertains to generation of activity determinations associated with a specific road taken by a user. For instance, a trained model is adapted to detect when a motor vehicle is stopped on a highway, as compared with a local road, which may provide a strong indication that a driver may require assistance. A highway is any road with few stops and higher speed limits, where different types of highways (e.g., freeways, interstate highways) are known to one skilled in the field of art, all of which are intended to be covered by the teachings of the present disclosure. A freeway is a highway that doesn't have a toll. However, it is to be recognized that a trained model (e.g., trained AI model) is adaptable to generate vehicle activity determinations on any type of road. With respect to specific roads, a comprehensive analysis of signal data, as described herein, can yield accurate and precise determinations with respect to vehicle activity including why a vehicle is stopped. For instance, a vehicle may be stopped at a stop sign, stuck in traffic, picking up a passenger, etc., which can be differentiated from contextual scenarios where a notification (e.g., emergency alert notification) may need to be generated.

Exemplary GUI notifications can be automatically generated pertaining to activity determinations of a vehicle (vehicle activity determinations), where the GUI notifications can be automatically provided to one or more users. For instance, an exemplary GUI notification can be automatically provided to an emergency contact (e.g., parent) of a driver in real-time (or near real-time) when it is detected that a vehicle has stopped (e.g., on a specific road such as a highway). Additional examples of the present disclosure pertain to an improved GUI for a driving safety application/service. For instance, users have control over automatic transmission of GUI notifications as well as access to summary report information pertaining to vehicle activity determinations.

One non-limiting example of the present disclosure pertains to automatic generation and rendering of a GUI notification that comprises an activity determination (e.g., vehicle activity determination) predicting why a motor vehicle is stopped, for example, on a highway. Activity signal data, comprising location data and motion activity data, is detected from a mobile computing device. Exemplary motion activity data comprises: signal data of the mobile computing device received from different sensors associated with the mobile computing device including: an accelerometer; a gyroscope; a magnetometer; or a combination thereof. In further examples, the activity signal data comprises signal data indicating a state of operation of the mobile computing device such as whether the mobile computing device is in an idle state. Other types of signal data described herein are also includable in activity signal data. Analysis of the activity signal data yields a determination that the mobile computing device is onboard a vehicle (e.g., motor vehicle). The activity signal data is further analyzed to determine that the vehicle (e.g., motor vehicle) is stopped, for example, on a specific type of road. A trained model (e.g., trained AI model) is applied, where the trained model is adapted to generate confidence scoring for generation of one or more activity determinations predicting why the motor vehicle is stopped. Exemplary confidence scoring is generated based on a contextual analysis that comprises an evaluation of the activity signal data. The contextual analysis derives parameters to generate confidence scoring. For example, confidence scoring is generated based on analysis of two or more of: driving behavior of the motor vehicle prior to the motor vehicle being stopped; a determination as to a type of road, of the specific road, that the motor vehicle is stopped on; an evaluation of traffic information associated with a specific road (e.g., highway) that the motor vehicle is stopped on; an evaluation of historical driving patterns associated with a user of the mobile computing device relative to roads traveled/taken; and an evaluation of historical driving behaviors associated with the user of the mobile computing device, among other types of data.

In one example, an exemplary contextual analysis further comprises an evaluation of historical driving patterns associated with a user of the mobile computing device relative to roads taken/traveled (e.g., historically). This type of historical analysis focuses on locational/navigational history of a user. That is, a determination as to the type of road that the motor vehicle is stopped on is further determined based on analysis of the historical driving patterns as well as an analysis of the activity signal data (current). Historical driving patterns can further be used as a false positive determination of trained model, where historical driving patterns can determine if a user typically stops on a specific road (e.g., to get gas or coffee) which may be an indication that an emergency notification may not need to be sent. Additionally, historical driving patterns pertaining to driving behaviors of a user can also be analyzed and utilized for aiding contextual analysis. For instance, a determination as to the driving behavior of the motor vehicle prior to the motor vehicle being stopped is further determined based on analysis of data of historical driving behaviors associated with historical driving behaviors of the user of the mobile computing device as well as the activity signal data (current). This can help minimize false positives, when previous driving behaviors suggest against an emergency, as well as help determine if a ticket, accident, flat tire, etc., is likely to have occurred based on historical patterns of a driver.

Continuing the above example, application of a trained model selects an activity determination, from the one or more activity determinations associated with the vehicle, that indicates a prediction as to why the vehicle (e.g., motor vehicle) is stopped on a road based on a result of analyzing the confidence scoring. For instance, a threshold may be applied to select N number of predictions (e.g., one or more activity determinations) based on a result of analysis of specific confidence scores associated with individual activity determinations. In one example, an activity determination having a highest confidence score is selected for output. A GUI notification is automatically generated that comprises data associated with the activity determination indicating a prediction as to why the vehicle (e.g., motor vehicle) is stopped. In some examples, the GUI notification is automatically rendered via the mobile computing device. In distributed examples where analysis occurs via a different computing device (e.g., server device) from that which the GUI notification is to be provided, data for rendering the GUI notification is transmitted to the mobile computing device. In further examples, an GUI notification is automatically transmitted to (and subsequently rendered via) another computing device. For instance, an emergency contact (e.g., parent, guardian, friend) receives a GUI notification of activity of the motor vehicle.

An exemplary GUI notification efficiently provides contextual data pertaining to an activity determination (e.g., vehicle activity determination) including but not limited to: one or more activity determinations; rationale/reasons for a predicted activity determination (e.g., why the motor vehicle is stopped on a specific road); data insights providing contextual information/specifics about an activity determination; pertinent signal data (e.g., speed, velocity, braking, accelerometer, gyroscope, magnetometer) that is used to generate activity determination and recommendation actions pertaining to the activity determination (e.g., tips, suggestions, helpful links, GUI elements that trigger automatic action such as initiation of communications with other users, calling emergency services, roadside assistance, etc.). In one example, a live stream between a user and one or more other users can be automatically initiated through a selection of a GUI element of an exemplary GUI notification providing an activity determination of a vehicle. This is extremely helpful to provide support when a driver is pulled over (e.g., interacting with law enforcement) as well as in need of assistance to due to accidents, needing of directions, car trouble (e.g., flat tire, out of gas or electrical charge), etc.

In further examples, exemplary GUI notifications are integrated within an application/service adapted for driving safety. Activity determinations can be associated with a specific user account, where driving activity (e.g., behaviors and/or patterns) can be summarized, for example, in a report form. A non-limiting example of an interactive GUI summary report is provided in FIG. 3E. A summary report aids users in understanding the driving behaviors and/or patterns of a user relative to operation of a vehicle. An exemplary summary report is extremely beneficial to providing reporting/analytics for any drivers including drivers who may require assistance or seek improvement. In some examples, summary report information comprises analytics that help users understand how they are driving relative to other users (e.g., other users in their age bracket). In further technical instances, summary report information provides analytics pertaining to vehicle stoppage; locational patterns (e.g., mappings of roads taken by user); driving behaviors (e.g., speed, braking, acceleration, swerving, average driving distance/time) and tips/recommendations for improving driving behaviors and/or driving patterns.

Some non-limiting examples of the present disclosure focus on specific types of roads such as highways. For instance, there may be any number of reasons as to why a driver is stopped on a local road (e.g., residential neighborhood). It is less likely that a driver would be stopped on a highway unless there was something wrong. As such, trained models can be adapted to focus the generation of GUI notifications on specific roads (e.g., highways). This may be done using location data of a mobile computing device and correlating the location data with map data to identify that a driver is stopped on. In technical instances where it is determined that a vehicle is stopped on a specific road (e.g., highway), subsequent contextual analysis of activity signal data is conducted to generate activity determinations for a vehicle and associated GUI notifications.

Since there are a wide variety of reasons that a vehicle could be stopped on a road, some of which do not require assistance, the present disclosure further provides ways to minimize false positives and subsequently provide GUI notifications in appropriate technical instances. As previously described, examples of historical driving patterns and historical driving behaviors of a user are used to improve confidence scoring and minimize false positives identifying instances where emergency notifications may not be required to be generated and transmitted. Contextual analysis further contemplates evaluation of traffic information including data indicating traffic patterns from vehicle navigation applications/services (e.g., GPS navigation applications/services); roadway information (e.g., from transportation applications/services, related websites); and map applications/services (e.g., BING® Maps), among other examples. In instances where it is identified that there is traffic on a specific road that the vehicle is traveling on, it may be less likely that a user is stopped for a reason that requires emergency notification. However, GUI notifications of the present disclosure can still be generated for other users (e.g., transmitted to other computing devices) providing notice of an estimated arrival (e.g., user may be late for a dinner or appointment), driving directions, etc. In further technical instances, false positives can be further minimized by analyzing other types of signal data described herein. As previous identified, one type of signal data is activity data pertaining to a mobile computing device. For instance, if an idle signal is detected from a mobile computing device, that may be further evidence to support an accuracy of an activity determination where the user is preoccupied.

In further technical instances, activity of other applications/services (e.g., music, podcast, OS of a mobile computing device) can be used to determine the accuracy of an activity determination. For instance, if a streaming music application/service is streaming music that the user is listening to and the mobile computing device is locked, it may be less likely that an idle signal of a mobile computing device is an indication of an accident or being pulled over. Other types of signal data (e.g., user-specific signal data, application-specific signal data, device-specific signal data) are subsequently described and may be further utilized to improve accuracy in activity determinations. It is to be recognized that signal data is collected and analyzed in compliance user privacy regulations and policies. For instance, users may consent to monitoring of signal data to improve user experience and operation of applications/services associated with a software data platform and/or specific application/service. In further technical instances, application/services are adapted to provide users with control over what types of signal data is collected and used for analysis as well as when/who to send automatic notifications of activity determinations. For instance, a user can toggle GUI features/elements that turn on/off automatic notifications provided to other user computing devices (e.g., that of parents, instructors, friends, siblings).

Exemplary technical advantages provided by processing described in the present disclosure comprise but are not limited to: automatic generation of exemplary activity determinations of a vehicle (e.g., vehicle activity determinations) in real-time (or near real-time); automatic generation of exemplary GUI notifications comprising data associated with vehicle activity determinations; automatic notification of exemplary GUI notifications to computing devices of one or more users (including emergency contacts of a driver); application of novel trained AI processing to improve processing efficiency for generation of vehicle activity determinations (and associated notifications) as well as accuracy/precision of vehicle activity determinations and enhanced contextual analytics; ability to store and recall GUI notifications including incorporation of data pertaining to vehicle activity determinations in summary report information; an improved GUI provided through an application or service that is configured to manage data pertaining to vehicle activity determinations; improved GUI for control over driving safety applications/services including adapted GUI features/elements for control over contextual information and automatic notifications; improved processing efficiency (e.g., reduction in processing cycles, saving resources/bandwidth) for computing devices when generating vehicle activity determinations and associated GUI notifications; reduction in latency when generating vehicle activity determinations and associated GUI notifications; and interoperability to enable components described herein to interface with any type of application/service and any type of content, among other technical advantages.

FIG. 1 illustrates an exemplary system diagram 100 of components interfacing to enable generation and management of activity determinations of a vehicle and provision of associated GUI notifications, with which aspects of the present disclosure may be practiced. As an example, components illustrated in system diagram 100 may be executed by an exemplary computing system 401 (or multiple computing systems) as described in the description of FIG. 4. System diagram 100 describes components that may be utilized to execute processing operations described in method 200 (FIG. 2) as well as processing described in and associated with visual diagrams of FIGS. 3A-3E and the accompanying description. Moreover, interactions between components of system diagram 100 may be altered without departing from the spirit of the present disclosure. Exemplary components, described in system diagram 100, may be hardware and/or software components, which are programmed to execute processing operations described herein. In some examples, components of system diagram 100 may each be one or more computing devices associated with execution of a specific service. Exemplary services may be managed by a software data platform (e.g., distributed software platform) that also provides, to a component, access to and knowledge of other components that are associated with applications/services. In one instance, processing operations described in system diagram 100 may be implemented by one or more components connected over a distributed network, where a user account may be working with a specific profile established through a distributed software platform. System diagram 100 comprises user computing devices 102; an application/service component 104; a vehicle activity management component 106; a component for implementation of a programmed software module and/or trained AI processing 108; and knowledge repositories 110.

System diagram 100 comprises user computing device(s) 102. An example of a user computing device 102 is a computing system (or computing systems) as described in the description of FIG. 4. User computing device(s) 102 are intended to cover examples where a computing device is a client computing device. In some examples, user computing devices(s) 102 are onboard a vehicle. Onboard is intended to cover technical instances where the user computing device(s) 102 is available or situated upon/within a vehicle. In one non-limiting example, a user computing device 102 is a mobile computing device such as smart phone. In another technical example, user computing device 102 is a computing device integrated within a vehicle. In further examples, user computing device 102 is a device of another user (e.g., emergency contact) that is not onboard a vehicle. For instance, a user computing device 102 of another user may receive a GUI notification providing data associated with a vehicle activity determination.

Furthermore, user computing device(s) 102 may be specifically configured to enable users to access a driving safety application/service. An exemplary driving safety application/service is adapted to handle any facets of driving safety including but not limited to management of: profile information; settings (including settings of automatic notifications); emergency contacts; driving history; driving patterns; reports (including comprehensive summary reporting pertaining to vehicle operation); driving education and learning; driving directions; and compliance with driving laws and policies (e.g., license, insurance, registration), among other examples. Additional aspects of driving safety are known to one skilled in the field of art, where an exemplary driving safety application/service of the present disclosure may be adapted to include any such content. Users may utilize a user computing device 102 to access a user profile of a driving safety application/service. In some examples, GUI notifications are push notifications sent to a user computing device 102 of a user profile of a driving safety application/service. However, it is to be recognized that the present disclosure is intended to cover any technical instance where a GUI notification is rendered on a computing device (e.g., user computing device(s) 102) through any application/service, OS, etc.

As indicated in the foregoing, activity signal data associated with a computing device that is onboard a vehicle is detected and analyzed by a trained model to generate activity determinations of a vehicle (vehicle activity determinations). Non-limiting examples of signal data retrieved from a user computing device 102 comprise but are not limited to locational data (e.g., GPS/navigational data); motion activity data (e.g., obtained through analysis of one or more sensors of a computing device); activity state of a computing device (e.g., analysis of idle signals or whether a device is transmitting activity signals); application/service activity data (e.g., operation state of host applications/services on a computing device); device-specific configuration data; and user identification data (e.g., user-specific profile/account data registered with computing device, among other examples. The motion activity data comprises: signal data of the mobile computing device received from different sensors associated with a computing device (e.g., mobile computing device); including but not limited to the following sensors: an accelerometer; a gyroscope; a magnetometer; or a combination thereof. Other types of signal data subsequently described herein are also includable in activity signal data. Further detailed contextual analysis of the activity signal data, in combination with other types of signal data (e.g., locational data), enables complex contextual analysis of a vehicle, where multiple layers of determinations can be predictively generated with accuracy and precision. For instance, analysis of exemplary activity signal data yields a determination that the mobile computing device is onboard a vehicle (e.g., motor vehicle). The activity signal data can be further analyzed to determine that the vehicle (e.g., motor vehicle) is stopped, for example, on a specific type of road. Additionally, reasons/rationale as to why a vehicle is stopped can be predictively generated for inclusion in an exemplary GUI notification.

An application/service component 104 may be configured to manage data associated with host applications/services and associated endpoints. In doing so, an application/service component 104 may interface with one or more of: a user computing device 102; a vehicle activity management component 106; a component for implementation of a programmed software module and/or trained AI processing 108; and knowledge repositories 110. An application/service component 104 further manages presentation of a GUI usable to: enable exemplary GUI notifications providing data associated with activity determinations of a vehicle, including summary reports pertaining to activity determination; manage user profiles pertaining to host applications/services (e.g., driving safety application/service); and transmission of data (e.g., signal data) usable for contextual analysis of a computing device that is onboard a vehicle. Non-limiting visual examples of an improved GUI, and GUI elements provided therein, are provided in FIGS. 3A-3E.

A host application/service configured to enable execution of tasks by one or more user accounts. Non-limiting examples of host applications/services that are applicable in the present disclosure comprise but are not limited to: driving safety applications/services; open-source collaborative framework applications/services; video discussion applications/services; word processing applications/services; spreadsheet applications/services; notes/notetaking applications/services; authoring applications/services; digital presentation applications/services; presentation broadcasting applications/services; search engine applications/services; email applications/services; messaging applications/services; web browsing applications/services; collaborative communication applications/services; digital assistant applications/services; webpage building applications/service; directory applications/services; mapping services; calendaring services; electronic payment services; digital data storage or distributed data storage applications/services; web conferencing applications/services; call communication applications/services; navigational applications/services; language understanding applications/services; bot framework applications/services; networking applications/services; social networking applications/services; educational learning applications/services; and suites of applications/services that may collectively comprise a combination of one or more of the previously mentioned applications/services, among other examples. The application/service component 104 further manages respective endpoints associated with individual host applications/services, which have been referenced in the foregoing description. For instance, different versions of a host application/service may be generated and rendered depending on the computing device that is being used to access the host application/service. In some examples, an exemplary host application/service may be a component of a distributed software platform providing a suite of host applications/services and associated endpoints. A distributed software platform is configured to providing access to a plurality of applications/services, thereby enabling cross-application/service usage to enhance functionality of a specific application/service at run-time. For instance, a distributed software platform enables interfacing between a host service related to management of a distributed collaborative canvas and/or individual components associated therewith and other host application/service endpoints (e.g., configured for execution of specific tasks). Distributed software platforms may further manage tenant configurations/user accounts to manage access to features, applications/services, etc. as well access to distributed data storage (including user-specific distributed data storage). Moreover, specific host application/services (including those of a distributed software platform) may be configured to interface with other non-proprietary application/services (e.g., third-party applications/services) to extend functionality including data transformation and associated implementation. Furthermore, signal data, accessible via a distributed software platform, is usable to aid generation of activity determinations (e.g., vehicle activity determinations) as well as generation of associated data insights.

Host applications/services (and associated endpoints), provided by the application/service component 104, may interface with other components of system diagram 100 to enhance processing efficiency and functionality as described herein. The application/service component 104 is configured to interface with a user computing device(s) 102 as well as the vehicle activity management component 106, the component for implementation of a programmed software module and/or trained AI processing 108 and knowledge repositories 110 (e.g., of a distributed software platform). In doing so, contextual signal data may be collected and analyzed to enhance processing described herein including contextual analysis of signal data, generation of activity determinations pertaining to a vehicle and generation of GUI notifications including summary reporting information described herein.

In some examples, signal data may be collected and analyzed from more than one computing device (e.g., that is onboard a vehicle). For example, signal data from a mobile computing device of a driver and as well as signal data from a mobile computing device of a passenger may be analyzed in aggregation to generate activity determinations for a vehicle.

In any example contextual signal data may be further analyzed to aid with determinations executed by one or more trained models (e.g., trained AI models). Non-limiting examples of signal data that may be collected and analyzed comprises but is not limited to: device-specific signal data collected from operation of one or more user computing devices 102; user-specific signal data collected from specific tenants/user-accounts with respect to access to any of: devices, login to a distributed software platform, applications/services, etc.; vehicle-specific data of a vehicle (e.g., motor vehicle); and application-specific data collected from usage of applications/services including data (and metadata) associated with specific presentation content. Application-specific signal data may comprise not only current signal data instances, but also past usage of an application or service by one or more users.

Exemplary signal data for generating activity determinations (vehicle activity determinations) comprises activity signal data. As previously referenced, activity signal data comprises location data and motion activity data, is detected from a mobile computing device. The motion activity data comprises: signal data of the mobile computing device received from different sensors associated with the mobile computing device including: an accelerometer; a gyroscope; a magnetometer; or a combination thereof. In further examples, the activity signal data comprises signal data indicating a state of operation of the mobile computing device such as whether the mobile computing device is in an idle state. Analysis of the activity signal data yields a determination that the mobile computing device is onboard a vehicle (e.g., motor vehicle). The activity signal data is further analyzed to determine that the vehicle (e.g., motor vehicle) is stopped, for example, on a specific type of road. Notably, signal data retrieved from sensors of one or more computing devices are analyzed in aggregation with locational data (e.g., tracking a plurality of coordinate points over a given time period). As such, the present disclosure applies a fusion algorithm that fuses/combines, to generate activity determinations, locational data with motion activity data (e.g., data retrieved from one or more sensors such as an accelerometer, gyroscope and/or magnetometer) to generate activity determinations. Further, an exemplary fusion algorithm, in generating activity determinations, may further combine additional types of signal data (e.g., activity state of mobile computing device) and/or historical signal data. For instance, a trained AI model is adapted to contextually analyze multiple different types of signal data, in aggregation, to generate an activity determination. This enable a more comprehensive analysis for generating precise and accurate activity determinations, reduction of false positives, as well as generate complex contextual analysis of a vehicle, where multiple layers of determinations can be predictively generated with accuracy and precision.

Among other technical determinations, a fusion analysis of exemplary activity signal data yields a determination that the mobile computing device is onboard a vehicle (e.g., motor vehicle), that a vehicle is stopped, and a prediction as to why the vehicle is stopped. As previously referenced, signal data collected and analyzed may be historical signal data (e.g.,) historical driving patterns (locational) of a user and/or historical driving behaviors (e.g., analytics and/or metrics) pertaining to vehicle activity. In one example, an exemplary contextual analysis further comprises an evaluation of historical driving patterns associated with a user of the mobile computing device relative to roads taken/traveled (e.g., historically). This type of historical analysis focuses on locational/navigational history of a user. That is, a determination as to the type of road that the motor vehicle is stopped on is further determined based on analysis of the historical driving patterns as well as an analysis of the activity signal data (current). Historical driving patterns can further be used as a false positive determination of trained model, where historical driving patterns can determine if a user typically stops on a specific road (e.g., to get gas or coffee) which may be an indication that an emergency notification may not need to be sent. Additionally, historical driving patterns pertaining to driving behaviors of a user can also be analyzed and utilized for aiding contextual analysis. For instance, a determination as to the driving behavior of the motor vehicle prior to the motor vehicle being stopped is further determined based on analysis of data of historical driving behaviors associated with historical driving behaviors of the user of the mobile computing device as well as the activity signal data (current). This can help minimize false positives, when previous driving behaviors suggest against an emergency, as well as help determine if a ticket, accident, flat tire, etc., is likely to have occurred based on historical patterns of a driver.

With respect to any type of signal data described herein, the present disclosure may further execute curation processing to verify that signal data collected would be most useful to generation of an activity determination. For instance, locational data collected may be parsed and further evaluated to determine whether the locational data is high-accuracy locational data. As an example, GPS data may be collected and evaluated to confirm that the GPS data estimates a location of a mobile computing device/corresponding vehicle) is within a threshold distance (e.g., ten to twenty meters). For instance, if locational accuracy threshold is not satisfied, a trained model cannot with high confidence say driver is on a specific road (e.g., highway/freeway). For instance, a driver could have stopped at a gas station parallel/next to freeway rather than be on the freeway. As such, if a threshold for locational accuracy is not satisfied, then a determination may be made that an activity determination cannot be properly generated. This may result in a request for re-evaluation for generation of an activity determination at a later point in time. In another example, curation processing may be executed to determine whether a vehicle, via one or more mobile computing devices, is stationary or in motion. This type of analysis over a temporal representation can help yield a determination as to whether a vehicle is stopped (e.g., on a specific road). As such, one or more types of signal data pertaining to motion activity data may be evaluated to confirm whether a vehicle is in motion or is stationary. This may be another level of curation to determine whether an activity determination of a vehicle (vehicle activity determination) is to be generated. Moreover, thresholds may be set relative to the collection of motion activity data. For example, threshold may be set relative to the collection of data from different types of sensors of a computing device for contextual evaluation. For instance, a baseline reading of a sensor may be established and used to determine whether changes in motion activity data are detected. In some technical instances, thresholds are set for an amount of change relative to a baseline reading. As also described herein, additional types of signal data may be further utilized to curate generated activity determinations. For instance, confidence scoring is generated for activity determinations, where additional types of signal data (e.g., roadway information from transportation applications/services, related websites; data from map applications/services (e.g., BING® Maps), and/or historical signal data) are used to further generate accurate confidence scoring analytics and select a most appropriate activity determination for a vehicle.

The vehicle activity management component 106 is one or more components configured for management of activity determinations of a vehicle (vehicle activity determinations) and generation of GUI notifications thereof. Examples of processing operations executed by the vehicle activity management component 106 (and/or interaction with the component for implementation of a programmed software module and/or trained AI processing 108), comprise but are not limited to processing operations described in present disclosure including system diagram 100 (FIG. 1), method 200 (FIG. 2) as well as processing described in and associated with visual diagrams of FIGS. 3A-3E and the accompanying description. For readability of the present disclosure, those processing operations are not explicitly restated in the description of vehicle activity management component 106 but are understood to be executed thereby.

The vehicle activity management component 106 may further be configured to manage application of trained AI processing including building, training, and application of trained AI models (e.g., implemented as trained AI processing provided through component 108). In one example, a programmed software module (e.g., algorithm or discrete model) is trained to determine specific types of parameters associated with a vehicle and automatically generate vehicle activity determinations therefrom. For instance, an exemplary fusion algorithm may be configured as a discrete model that evaluates specific parameters described herein and generates a contextual determination therefrom.

In further technical instances, trained AI processing may be applied that is configured to automatically aid processing to contextually analysis signal data described herein, generate activity determinations and further generate exemplary GUI notifications therefrom. Trained AI processing 108 may comprise implementation of one or more trained AI models. Implementation of trained AI modeling including creating, adapting, training, and updating of a component for implementation of AI processing 108 is known to one skilled in the field of art. In technical instances where trained AI processing is applied, general application of trained AI processing including creation, training and update thereof is known to one skilled the field of art. Above what is traditionally known, trained AI processing may be adapted to execute specific determinations described herein with reference to any component of system diagram 100 and processing operations executed thereby. For instance, AI modeling may be specifically trained and adapted for execution of processing operations comprising but not limited to: data collection including collection of: retail computing devices (e.g., mobile computing devices of users of a distributed software platform and/or specific application/services (e.g., driving safety application/service); flight testing data (e.g., flighting of computing devices in a testing program); a corpus of training data comprising feedback on accuracy of predictive activity determinations from prior iterations of trained AI processing; identification of types of signal data usable to generate accurate activity determinations of a vehicle; defining parameters for generation of activity determinations; labeling of parameters for generation of activity determinations; executing of sanitization and clipping of data to tailor a data distribution that is representative of computing devices across a population of users, hyperparameter tuning of identified parameters associated with generating activity determinations; selection of applicable trained AI models, form a plurality of applicable trained AI models, for contextually relevant analysis; generation of data insights pertaining to activity determinations; generating notifications (GUI notifications) comprising activity determinations and/or related data insights; and execution of relevance scoring/ranking analysis for generating activity determinations of a vehicle and/or data insights including suggestive/recommended data insights, among other examples. As such, trained AI processing may be applicable to aid any type of determinative or predictive processing including specific processing operations described about with respect to determinations, classification ranking/scoring and relevance ranking/scoring. This may occur via any of supervised learning; unsupervised learning; semi-supervised learning; or reinforcement learning, among other examples. Non-limiting examples of supervised learning that may be applied comprise but are not limited to: nearest neighbor processing; naive bayes classification processing; decision trees; linear regression; support vector machines (SVM) neural networks (e.g., deep neural network (DNN) convolutional neural network (CNN) or recurrent neural network (RNN)); and transformers, among other examples. Non-limiting of unsupervised learning that may be applied comprise but are not limited to: application of clustering processing including k-means for clustering problems, hierarchical clustering, mixture modeling, etc.; application of association rule learning; application of latent variable modeling; anomaly detection; and neural network processing, among other examples. Non-limiting of semi-supervised learning that may be applied comprise but are not limited to: assumption determination processing; generative modeling; low-density separation processing and graph-based method processing, among other examples. Non-limiting of reinforcement learning that may be applied comprise but are not limited to: value-based processing; policy-based processing; and model-based processing, among other examples. Furthermore, trained AI processing may be continuously updated over time including based on receipt of user feedback regarding representations of provided through an improved GUI of an application or service.

To adapt AI processing for generation of activity determinations, among other determinations, number processing operations are executed comprising processing operations for: data collection; data labeling; training; hyperparameter tuning; and evaluation/re-training. Such processing is used to generate trained AI modeling that satisfies precision and accuracy thresholds set by developers. Accuracy of trained modeling may vary based on different activity determinations generated. For instance, depending on the complexity of the activity determination (e.g., vehicle is stopped versus determining a reason as to why a vehicle is stopped), developers may set different accuracy thresholds for confirming an activity determination. Thresholds set for specific activity determinations may vary without departing from the spirit of the present disclosure. Moreover, as a trained AI model is a learning model, accuracy can improve over time through iterations of training, receipt of feedback (e.g., user feedback as to accuracy of activity determinations), etc.

With respect to data collection, telemetric analysis is applied to ingest data to adequately train an AI model. Data ingestion processing for building of trained AI processing is known to one skilled in the field of art. Above what is traditionally known, data collection for a trained AI model focuses on specific data types that build a rich model for generating activity determinations of a vehicle. Importantly, it is to be recognized that signal data is collected, stored, and accessed in compliance with privacy laws and regulations. That is, parameters analyzed by a trained AI model are reflective of privacy laws and regulations. Trained AI processing further generates trained AI models that are privacy compliant with respect to access to user-specific data. In some technical instances, users may consent to having user-specific data accessed to improve their user experience and/or operation of an OS and associated applications/services. In such technical instances, trained AI modeling may incorporate user-specific parameters and/or signal data in its contextual analysis. As indicated in the foregoing description, developers may utilize different versions of trained AI models that can be selectively applied based on different contextual scenarios. Furthermore, exemplary modeling is trained and executed in a privacy compliant manner, where developers may never see/access user-specific data due to compliance requirements/restrictions. Moreover, data is retained in compliance with data retention policies and regulations.

Processing for generating a trained AI model then focuses on preparation of labeled data for a trained AI model. In one example, supervised learning is executed through a developer platform. Processing for data labeling and execution of supervised learning are known to one skilled in the field of art. Above what is traditionally known, a list of parameters is defined which adapts the AI model for a specific purpose related to generation of activity determinations and subsequent analysis thereof. For instance, a trained AI model may be adapted to: detect that one or more computing devices are onboard a vehicle; detection locational data associated with device(s) onboard a vehicle; detect driving behaviors such as: vehicle speed, direction, lane change indication; braking, etc., detect activity signals of computing devices; detect vehicle stopping; detect specific roadways of travel; retrieve real-time map/roadway information; and retrieve historical signal data for one or more user profiles, among other examples. As identified above, contextual analysis executed by trained AI processing may further consider signal data collected from one or more resources. Signal data may be collectively analyzed to generation determinations described herein including those where the reboot estimation management component 106 and/or the component configured for implementation of a programmed software module and/or trained AI processing 108 are executing importance/relevance scoring/ranking to automatically generate determinations described herein. For instance, application of a trained AI model (or models) may be trained to evaluate past and/or current user actions, user preferences, application/service log data, etc., that are each associated with one or more computing devices and/or user accounts. Non-limiting examples of signal data that may be collected and analyzed have been described in the foregoing description.

An integral part of the training process is application of a training algorithm that adapts a trained AI model for fusion analysis to generate activity determinations of a vehicle. As previously referenced, a trained AI model is trained and adapted to apply a fusion algorithm that evaluates a variety of types of signal data in aggregation, where said different types of signal data are abstracted and correlated, to generate accurate vehicle activity determinations. Analysis of such types of signal data in an aggregate manner may be useful in helping generate contextually relevant determinations, data insights, etc. Analysis of exemplary signal data may comprise identifying correlations and relationships between the different types of signal data, where telemetric analysis may be applied to generate determinations with respect to a contextual state of user activity with respect to one or more computing devices. For instance, a user may prefer to receive notifications through a specific OS GUI menu or host application/service endpoint as compared with other GUI menus and/or host application/service endpoints. As an example, a decision tree (e.g., a Gradient Boosting Decision Tree) is used to train an AI models. Above what is traditionally known, an exemplary training algorithm focuses on the defined list of parameters for generating determinations of activity determinations. In doing so, one or more types of decision tree algorithms can be applied generating any number of decision trees to fine-tune a trained AI model. Some parameters for generation of activity determinations are categorical and others may be continuous numbers. As such, additional processing operations may be applied to convert categorical parameters to a numerical representation including but not limited to: Gini, information gain and/or encoding, among other technical examples. An output result of a trained AI model may be a raw data value that is generated from any combination of types of signal data described above. An exemplary raw data value is a numerical representation that correlates with a confidence score for accuracy of a predictive activity determination. For instance, a raw data value may be 0.8333, where that raw data value can be rounded up (or down in alternative instances) to provide a confidence score (e.g., eighty-three (83) percent).

Knowledge repositories 110 may be accessed to obtain data for generation, training and implementation of trained AI processing as well the operation of processing operations by that of the application/service component 104 and the vehicle activity management component 106. Knowledge resources comprise any data affiliated with a software application platform (e.g., Microsoft®, Google®, Apple®, IBM®) as well as data that is obtained through interfacing with resources over a network connection including third-party applications/services. Knowledge repositories 110 may be resources accessible in a distributed manner via network connection that may store data usable to improve processing operations executed by the presentation feed management component 106 and/or the trained AI processing.

Knowledge repositories 110 may be data stored on a distributed data storage that is accessible over a network connection. However, in some examples, data described with respect to knowledge repositories 110 may be stored locally on a computing device. Examples of data maintained by knowledge repositories 110 comprises but is not limited to: collected signal data (e.g., from usage of an application/service, device-specific, user-specific, vehicle-specific); telemetry data including past usage of a specific user and/or group of users; corpuses of annotated data used to build and train AI processing classifiers for trained relevance modeling; access to entity databases and/or other network graph databases; web-based resources including any data accessible via network connection including data stored via distributed data storage; trained bots including those for natural language understanding; data for stored representations of data insight suggestions; and application/service data (e.g., data of applications/services managed by the application/service component 104) for execution of specific applications/services including electronic document meta-data, among other examples. Moreover, knowledge repositories 110 may further comprise access to a cloud-assistance service that is configured to extend language understanding processing and transcription processing including user context analysis to derive a current context of a user communication (e.g., evaluation of user speech, written content and/or gestures). The cloud-assistance service may provide the vehicle activity management component 106 and/or application/service component 104 with access to larger and more robust library of stored data for execution of language understanding/natural language understanding processing including transcribing audio signals received from users/participants, optical recognition processing and/or gesture evaluation (including intent of a gesture). Access to the cloud-assistance service may be provided when an application/service is accessing content in a distributed service-based example (e.g., a user is utilizing a network connection to access an application/service), as the data of the cloud-assistance service may be too large to store locally. In further examples, the vehicle activity management component 106 may be configurable to interface with a web search service, entity relationship databases, etc., to extend a corpus of data to make the most informed decisions when generating determinations related to contextual analysis of vehicle activity. In further examples, telemetry data may be collected, aggregated and correlated (e.g., by an interfacing application/service) to further provide components of system diagram 100 with on-demand access to telemetry data which can aid determinations generated thereby including generation of activity determinations for a vehicle.

Knowledge repositories 110 are further utilized to store data pertaining to historical driving patterns and behaviors of users. This data can be accessed to aid real-time (or near real-time) evaluation in generating activity determinations. Furthermore, knowledge repositories may store map data for specific locational data (e.g., GPS coordinates) associated with a mobile computing device. Exemplary map data may be retrieved in either a vector format or a bitmap format. In one example, a trained model is adapted to retrieve map data, associated with GPS coordinates, in a bitmap format. Doing so makes it easier (and more efficient) to analyze location data and subsequently match location data with known roadways such as local roads and/or highways. With a vector format, there may be more to unpack. As such, different versions of a trained model (e.g., trained AI model) may be applied based on latency requirements of applications/services that may be interfacing with components that generate vehicle activity determinations. Initially, processing to evaluate map data may be time and labor intensive, but a corpus of map data may be retrieved and analyzed to effectively enable real-time (or near real-time) processing to seamlessly occur with minimal latency. For instance, map data may be analyzed, where different types of roads may be identified through edge detection processing and subsequently labeled (e.g., color-coded identifications). In further technical instances, specific landmarks, objects, etc. may also be labeled and used as points of reference. For instance, modified map data may identify stop signs, traffic lights, building etc., where such data can be used to aid contextual evaluation. As such, modified map data is created that is adapted for the purpose of roadway identification at run-time of a trained AI model. Recall of map data at run-time can yield fast and accurate determinations as to the type of roadway that a vehicle may be traveling on. At run-time, a quick lookup operation is executed using modified map data that is stored and recalled by a trained model. A trained model is further adapted to interface with mapping data resources to continuously make sure that map data is current and up to date. In some examples, a trained AI model is adapted to generate activity determinations of a vehicle only in contextual situations where a specific type of road/ roadway is identified as a location (e.g., where a vehicle is stopped). For instance, if a motor vehicle is stopped on a highway, subsequent contextual analysis is then executed to generate a vehicle activity determination. In other technical instances, a vehicle activity determination is generated for a vehicle traveling on any type of road/roadway.

FIG. 2 illustrates an exemplary method 200 related to generation and management of activity determinations of a vehicle and provision of associated GUI notifications, with which aspects of the present disclosure may be practiced. As an example, method 200 may be executed across an exemplary computing system 401 (or computing systems) as described in the description of FIG. 4. Exemplary components, described in method 200, may be hardware and/or software components, which are programmed to execute processing operations described herein. Non-limiting examples of components for operations of processing operations in method 200 are described in system diagram 100 (FIG. 1). Processing operations performed in method 200 may correspond to operations executed by a system and/or service that execute computer modules/programs, software agents, APIs, plugins, AI processing including application of trained data models, intelligent bots, deep learning modeling including neural networks, transformers and/or other types of machine-learning processing, among other examples. In one non-limiting example, processing operations described in method 200 may be executed by a component such as the vehicle activity management component 106 (of FIG. 1) and/or the component for implementation of a programmed software module and/or trained AI processing 108 (FIG. 1). In distributed examples, processing operations described in method 200 may be implemented by one or more computer components connected over a distributed network. For example, computer components may be executed on one or more network-enabled computing devices, connected over a distributed network, that enable access to user communications. It is further to be recognized that an order of execution of processing operations in method 200 may vary without departing from the spirit of the present disclosure. Furthermore, variations of method 200 may be comprise execution of one or more of the processing operations identified in method 200 even omitting some of the processing operations depending on a device and/or system that is executing processing.

Some examples of method 200 begin at processing operation 202, where trained AI modeling (e.g., one or more trained AI models) is generated that is adapted to generate activity determinations of a vehicle (vehicle activity determinations) from analysis of one or more computing device (e.g., mobile computing devices onboard a vehicle). This may occur in technical instances where trained AI modeling is being applied to generate activity determinations. In alternative instances, a programmed software module is executed that does not require application of trained AI processing. In examples where a trained AI model is being applied, generation and management of a trained AI model including training of one or more classifiers is known to one skilled in the field of art. Above what is traditionally known, processing operations are executed to adapt a trained AI model to generate vehicle activity determinations. Exemplary processing operations for doing so have been described in the foregoing description including the description of system diagram 100 (FIG. 1).

Train of AI processing may further comprise generating an AI model that is tuned to reflect specific metrics for accuracy, precision and/or recall before a trained AI model is exposed for real-time (near real-time) usage. Developers may set thresholds for specific analytics and/or metrics to make sure that a trained AI model is operating as expected. Thresholds for metric evaluation of a specific trained AI model may vary, depending on developer specifications, without departing from the spirit of the present disclosure. As an example, thresholds may be set relative to an accuracy of an activity determination of a vehicle, determination of usability of locational data and/or motion activity data, and historical signal data, among other examples describes herein. As indicated in the foregoing description, a plurality of trained AI models may be generated and adapted to execute in specific contextual scenarios pertaining to identification of parameters to evaluate. In some technical instances, one or more types of signal data may be unavailable for collection (e.g., one or more sensors are turned off or inactive). As such, a trained AI model may adjust in real-time (or near real-time) to collect applicable signal data and generate an accurate/precise activity determination.

Once a threshold (or thresholds) is met for exposing a trained AI model, flow of method 200 proceeds to processing operation 204. At processing operation 204, the trained AI modeling is exposed for real-time (or near real-time) evaluation pertaining to generation of an activity determination of a vehicle (vehicle activity determination).

During real-time (or near real-time) evaluation, flow of method 200 proceeds to processing operation 206. At processing operation 206, signal data is detected for contextual real-time (or near real-time) evaluation of a vehicle. Non-limiting examples of signal data have been described in the foregoing description. In at least one example, signal data comprises activity signal data detected from a mobile computing device. Exemplary activity signal data comprises location data and motion activity data that is detected from one or more sensors of a mobile computing device that is onboard/traveling with a vehicle. The motion activity data comprises: signal data of the mobile computing device received from different sensors associated with the mobile computing device including: an accelerometer; a gyroscope; a magnetometer; or a combination thereof. In further examples, the activity signal data comprises signal data indicating a state of operation of the mobile computing device such as whether the mobile computing device is in an idle state. Other types of signal data described herein are also includable in activity signal data. Analysis of the activity signal data yields a determination that the mobile computing device is onboard a vehicle (e.g., motor vehicle).

As an example, raw signal data from sensors of a mobile computing device are retrieved. Processing for preparing raw signal data for subsequent contextual analysis is known to one skilled in the field of art. Above what is traditionally known, a fusion algorithm is applied that aggregates and correlates raw signal data collected from one or more sensors with locational data associated with a computing device. Representation of vehicle activity, over temporal representations (e.g., timestamp data), can be generated showing a progression of vehicle activity for detected locations. Temporal representations of vehicle activity can be comparatively analyzed to generate activity determinations described herein including but not limited to: determinations as to whether a computing device is onboard a vehicle; determinations as to whether a vehicle is stopped; and activity determinations of a vehicle, among other examples. One non-limiting example of the present disclosure pertains to automatic generation and rendering of a GUI notification that comprises an activity determination (e.g., vehicle activity determination) predicting why a motor vehicle is stopped, for example, on a highway.

Once signal data is retrieved and prepared for analysis, flow of method 200 proceeds to processing operation 208. At processing operation 208, a determination is made confirming whether (or not) a computing device (e.g., mobile computing device) is onboard a vehicle. This analysis confirms whether activity signal data associated with a computing device can be used to generate an activity determination of a vehicle. For example, activity signal data, collected from one or more sensors of a computing device, can be analyzed to determine a type of vehicle associated with motion activity. For instance, a plurality of points of locational data can be analyzed to determine the amount of distance traveled over a given time period as well as other signal data (e.g., speed, velocity), which can provide a determination as to whether a user traveling with a mobile computing device is walking, running, or in a vehicle (and/or distinguish types of vehicles such as bicycle from a motor vehicle). For example, processing operation 208 is utilized to predict the vehicle type (e.g., motor vehicle such as a car/truck). In some examples, a trained AI model may comprise a corpus of reference data, associated with vehicle types, to generate a determination as to what type of vehicle a mobile computing device is associated with. For instance, rate of speed, velocity, stopping distance, change of direction, etc., can all be indications of a vehicle type. As referenced in the foregoing description, other types of signal data (e.g., vehicle sensor data or other types of signal data transmitted from a vehicle) can further be used to confirm the vehicle type.

Flow of method 200 then proceeds to processing operation 210. At processing operation 210, signal data is further analyzed to determine that the vehicle (e.g., motor vehicle) is stopped, for example, on a specific type of road. Similar to the analysis to determine a vehicle type, signal data, including activity signal data, is comparatively analyzed to determine that a vehicle has come to a stop. For instance, a plurality of points of locational data can be analyzed to determine the amount of distance traveled over a given time period as well as other signal data (e.g., speed, velocity, direction), which can provide a determination as to whether a vehicle has stopped moving. In some alternative examples, processing operation 210 is not required as an activity determination of a vehicle may not be based on whether a vehicle is stopped. However, in other examples, a trained AI model focuses on whether a vehicle is stopped and progresses to determine a reason/rationale as to why the vehicle is stopped. Furthermore, locational data (e.g., GPS coordinates) may be further analyzed to determine a specific type of road that a vehicle is stopped on.

As previously referenced, a level of curation may be applied to determine that high-accuracy locational data is obtained. As an example, a threshold is set relative to the locational data to determine how accurate the locational data is. If the threshold is satisfied, indicating that the locational data is high-accuracy, subsequent processing is executed to determine a specific road that a user is on. For example, a trained AI model is adapted to generate a determination as to the likelihood that a user is driving (or stopped) on a highway as opposed to a local road. For instance, a trained model is adapted to detect when a motor vehicle is stopped on a highway, as compared with a local road, which may provide a stronger indication that a driver may require assistance. A highway is any road with few stops and high speed limits, where different types of highways (e.g., freeways, interstate highways) are known to one skilled in the field of art, all of which are intended to be covered by the teachings of the present disclosure A freeway is a highway that doesn't have a toll. However, it is to be recognized that a trained model (e.g., trained AI model) is adaptable to generate vehicle activity determinations on any type of road. With respect to specific roads, a comprehensive analysis of signal data, as described herein, can yield accurate and precise determinations with respect to vehicle activity including why a vehicle is stopped. For instance, a vehicle may be stopped at a stop sign, stuck in traffic, picking up a passenger, etc., which can be differentiated from contextual scenarios where a notification (e.g., emergency alert notification) may need to be generated.

In doing so, a trained model (e.g., trained AI model) is configured to retrieve map data from a knowledge repository (e.g., one or more knowledge repositories 110 of FIG. 1) that provides map data for specific locational data (e.g., GPS coordinates) associated with a mobile computing device. Exemplary map data may be retrieved in either a vector format or a bitmap format. In one example, a trained model is adapted to retrieve map data, associated with GPS coordinates, in a bitmap format. Doing so makes it easier (and more efficient) to analyze location data and subsequently match location data with known roadways such as local roads and/or highways. With a vector format, there may be more to unpack. As such, different versions of a trained model (e.g., trained AI model) may be applied based on latency requirements of applications/services that may be interfacing with components that generate vehicle activity determinations. Initially, processing to evaluate map data may be time and labor intensive, but a corpus of map data may be retrieved and analyzed to effectively enable real-time (or near real-time) processing to seamlessly occur with minimal latency. For instance, map data may be analyzed, where different types of roads may be identified through edge detection processing and subsequently labeled (e.g., color-coded identifications). In further technical instances, specific landmarks, objects, etc. may also be labeled and used as points of reference. For instance, modified map data may identify stop signs, traffic lights, building etc., where such data can be used to aid contextual evaluation. For example, a determination can be made from analysis of modified map data that a user is traveling through a school zone. Continuing that example, analysis of activity signal data could indicate that a user is speeding through the school zone. If it is detected that the user is stopped right outside the school zone, the collective contextual analysis can provide a strong indication that the user may have been pulled over for speeding through the school zone. Other types of signal data can further be analysis to help confirm (or disprove) this predictive determination.

As such, modified map data is created that is adapted for the purpose of roadway identification at run-time of a trained AI model. Recall of map data at run-time can yield fast and accurate determinations as to the type of roadway that a vehicle may be traveling on as well as aid vehicle activity determinations. At run-time, a quick lookup operation is executed using modified map data that is stored and recalled by a trained model. A trained model is further adapted to interface with mapping data resources to continuously make sure that map data is current and up to date. In some examples, a trained AI model is adapted to generate activity determinations of a vehicle only in contextual situations where a specific type of road/roadway is identified as a location (e.g., where a vehicle is stopped). For instance, if a motor vehicle is stopped on a highway, subsequent contextual analysis is then executed to generate a vehicle activity determination. In other technical instances, a vehicle activity determination is generated for a vehicle traveling on any type of road/roadway.

At processing operation 212, a trained model (e.g., trained AI model) is applied, where the trained model is adapted to generate confidence scoring for generation of one or more activity determinations of a vehicle. For instance, in an example where it is determined that a vehicle is stopped predicting why the motor vehicle is stopped. Exemplary confidence scoring is generated based on a contextual analysis that comprises an evaluation of the activity signal data, among other types of signal data. The contextual analysis derives parameters to generate confidence scoring. For example, confidence scoring is generated based on analysis of two or more of: driving behavior of the motor vehicle prior to the motor vehicle being stopped; a determination as to a type of road, of the specific road, that the motor vehicle is stopped on; an evaluation of traffic information associated with a specific road (e.g., highway) that the motor vehicle is stopped on; an evaluation of historical driving patterns associated with a user of the mobile computing device relative to roads traveled/taken; and an evaluation of historical driving behaviors associated with the user of the mobile computing device, among other types of data.

In one example, an exemplary contextual analysis further comprises an evaluation of historical driving patterns associated with a user of the mobile computing device relative to roads taken/traveled (e.g., historically). This type of historical analysis focuses on locational/navigational history of a user. That is, a determination as to the type of road that the motor vehicle is stopped on is further determined based on analysis of the historical driving patterns as well as an analysis of the activity signal data (current). Historical driving patterns can further be used as a false positive determination of trained model, where historical driving patterns can determine if a user typically stops on a specific road (e.g., to get gas or coffee) which may be an indication that an emergency notification may not need to be sent. Additionally, historical driving patterns pertaining to driving behaviors of a user can also be analyzed and utilized for aiding contextual analysis. For instance, a determination as to the driving behavior of the motor vehicle prior to the motor vehicle being stopped is further determined based on analysis of data of historical driving behaviors associated with historical driving behaviors of the user of the mobile computing device as well as the activity signal data (current). This can help minimize false positives, when previous driving behaviors suggest against an emergency, as well as help determine if a ticket, accident, flat tire, etc., is likely to have occurred based on historical patterns of a driver.

Continuing the above example, application of a trained model (processing operation 212) selects an activity determination, from the one or more activity determinations associated with the vehicle, that indicates a prediction as to why the vehicle (e.g., motor vehicle) is stopped on a road based on a result of analyzing the confidence scoring. For instance, a threshold may be applied to select N number of predictions (e.g., one or more activity determinations) based on a result of analysis of specific confidence scores associated with individual activity determinations. In one example, an activity determination having a highest confidence score is selected for output.

Since there are a wide variety of reasons that a vehicle could be stopped on a road, some of which do not require assistance, the present disclosure further provides ways to minimize false positives and subsequently provide GUI notifications in appropriate technical instances. As previously described, examples of historical driving patterns and historical driving behaviors of a user are used to improve confidence scoring and minimize false positives identifying instances where emergency notifications may not be required to be generated and transmitted. Contextual analysis further contemplates evaluation of traffic information including data indicating traffic patterns from vehicle navigation applications/services (e.g., GPS navigation applications/services); roadway information (e.g., from transportation applications/services, related web sites); and map applications/services (e.g., BING® Maps), among other examples. In instances where it is identified that there is traffic on a specific road that the vehicle is traveling on, it may be less likely that a user is stopped for a reason that requires emergency notification. However, GUI notifications of the present disclosure can still be generated for other users (e.g., transmitted to other computing devices) providing notice of an estimated arrival (e.g., user may be late for a dinner or appointment). In further technical instances, false positives can be further minimized by analyzing other types of signal data described herein. As previous identified, one type of signal data is activity data pertaining to a mobile computing device. For instance, if an idle signal is detected from a mobile computing device, that may be further evidence to support an accuracy of an activity determination where the user is preoccupied.

In further technical instances, activity of other applications/services (e.g., music, podcast, OS of a mobile computing device) can be used to determine the accuracy of an activity determination. For instance, if a streaming music application/service is streaming music that the user is listening to and the mobile computing device is locked, it may be less likely that an idle signal of a mobile computing device is an indication of an accident or being pulled over. Other types of signal data (e.g., user-specific signal data, application-specific signal data, device-specific signal data) are subsequently described and may be further utilized to improve accuracy in activity determinations. It is to be recognized that signal data is collected and analyzed in compliance user privacy regulations and policies. For instance, users may consent to monitoring of signal data to improve user experience and operation of applications/services associated with a software data platform and/or specific application/service. In further technical instances, application/services are adapted to provide users with control over what types of signal data is collected and used for analysis as well as when/who to send automatic notifications of activity determinations. For instance, a user can toggle GUI features/elements that turn on/off automatic notifications provided to other user computing devices (e.g., that of parents, instructors, friends, siblings).

Flow of method 200 then proceeds to processing operation 214. At processing operation 214, a GUI notification is automatically generated that comprises data associated with the activity determination indicating a prediction as to why the vehicle (e.g., motor vehicle) is stopped. An exemplary GUI notification efficiently provides contextual data pertaining to an activity determination (e.g., vehicle activity determination) including but not limited to: one or more activity determinations; rationale/reasons for a predicted activity determination (e.g., why the motor vehicle is stopped on a specific road); data insights providing contextual information/specifics about an activity determination; pertinent signal data (e.g., speed, velocity, braking, accelerometer, gyroscope, magnetometer) that is used to generate activity determination and recommendation actions pertaining to the activity determination (e.g., tips, suggestions, helpful links, GUI elements that trigger automatic action such as initiation of communications with other users, calling emergency services, roadside assistance, etc.). In one example, a live stream between a user and one or more other users can be automatically initiated through a selection of a GUI element of an exemplary GUI notification providing an activity determination of a vehicle. This is extremely helpful providing support when a driver is pulled over (e.g., interacting with law enforcement) as well as in need of assistance to due to accidents, car trouble (e.g., flat tire, out of gas or electrical charge), etc.

In further examples, exemplary GUI notifications are integrated within an application/service adapted for driving safety. Activity determinations can be associated with a specific user account, where driving activity (e.g., behaviors and/or patterns) can be summarized, for example, in a report form. A non-limiting example of an interactive GUI summary report is provided in FIG. 3E. A summary report aids users in understanding the driving behaviors and/or patterns of a user relative to operation of a vehicle. For instance, this is extremely beneficial to monitor new drivers and/or senior drivers, who may require assistance. In some examples, summary report information comprises analytics that help users understand how they are driving relative to other users (e.g., other users in their age bracket). In further technical instances, summary report information provides analytics pertaining to vehicle stoppage; locational patterns (e.g., mappings of roads taken by user); driving behaviors (e.g., speed, braking, acceleration, swerving, average driving distance/time) and tips/recommendations for improving driving behaviors and/or driving patterns.

Processing operation 214 may further determine an intended recipient of a GUI notification. For instance, a user of a computing device (e.g., mobile computing device) may be associated with a user profile of a driving safety application/service. Additionally, user profile data of a user profile (of the driving safety application/service) may be analyzed to determine preferred notification settings for transmission of GUI notifications pertaining to vehicle activity determinations. For instance, a determination is made as to whether a user has emergency contact information stored and preferred notifications settings with respect to said emergency contact. This can help determine whether a GUI notification is to be automatically transmitted to one or more computing devices of a user (e.g., driver/passenger of a vehicle) and/or other users (e.g., computing devices of an emergency contact of that user). Some non-limiting examples of management of emergency contact information and other GUI features of a driving safety application/service are illustrated in FIGS. 3D-3E and further described in the accompanying description.

Flow of method 200 then proceeds to processing operation 216. At processing operation 216, a generated GUI notification is stored for recall. For example, a generated GUI notification may not always be immediately transmitted for rendering. In other technical instances, versions of GUI notifications may be stored for recall including modification of GUI notifications to avoid having to recreate the wheel when it comes to efficiently generating notification. For instance, formatting of GUI notifications can be saved and modified with updated contextual information to quickly and efficiently generate new GUI notifications. In any example, a generated GUI notification may be stored (processing operation 216) on a distributed data storage (e.g., associated with a knowledge repository 110 of FIG. 1).

Some technical instances of the present disclosure pertain to those where activity determinations and associated GUI notifications are generated in a distributed fashion. (e.g., via one or more servers). In such technical instances, flow of method 200 proceeds to processing operation 218. At processing operation 218, a GUI notification is automatically transmitted to (and subsequently rendered via) another computing device. For instance, an emergency contact (e.g., parent, guardian, friend) receives a GUI notification of activity of the motor vehicle. In other examples, a GUI notification, intended for a driver/passenger of a vehicle (e.g., motor vehicle) receives a transmission of data for rendering a GUI notification. In further technical instances, a computing device that generates an activity determination of a vehicle and/or a GUI notification is the same computing device that renders the GUI notification.

In any technical instance, a GUI notification is then rendered (processing operation 220) via a computing device (or peripheral device associated with a computing device). In some examples, the GUI notification is automatically rendered (processing operation 22) via the mobile computing device from which activity signal data is detected. In distributed examples where analysis occurs via a different computing device (e.g., server device) from that which the GUI notification is to be provided, data for rendering the GUI notification is transmitted to said mobile computing device.

Flow of method 200 then proceeds to decision operation 222. At decision operation 222, it is determined whether a user interaction with an exemplary GUI notification is received. In examples where no user interaction is received, flow of decision operation 222 branches "NO" and processing of method 200 proceeds directly to processing operation 226. In examples where a user interaction is received, flow of decision operation 222 branches "YES" and processing of method 200 proceeds directly to processing operation 224. At processing operation 224, subsequent actions are executed to update a GUI notification based on the specific user interaction received. For instance, a user may wish to select a link to navigate to additional contextual information, or drill into different representation of the GUI notification (or a specific data insight).

In some examples, an exemplary GUI notification is adapted to comprise GUI elements that enable users to provide user feedback pertaining to the GUI notification such as accuracy/precision of the GUI notification and/or user preferences for receiving certain content types within a GUI notification. In technical instances where user feedback is received, either through the GUI notification or other means as known to one skilled in the field of art, flow of method 200 proceeds to processing operation 226. At processing operation 226, user feedback pertaining to the GUI notification (or specific GUI elements thereof) is received. User feedback may be utilized to update a subsequent iteration of a trained AI model. As such, flow of method 200 may then return back to processing operation 202, where a trained AI model is updated.

FIGS. 3A-3E illustrate exemplary processing device views associated with user interface examples for improved user interfaces that are used to provide exemplary GUI notifications comprising activity determinations for a vehicle as well as manage relevant contextual data, with which aspects of the present disclosure may be practiced. FIGS. 3A-3E provide non-limiting front-end examples of processing described in the foregoing including system diagram 100 (FIG. 1) and method 200 (FIG. 2). Furthermore, FIGS. 3A-3E provide GUI examples that may be rendered on a computing device such as computing system 401.

FIG. 3A presents processing device view 300, illustrating a non-limiting example of an exemplary GUI notification 302 configured to provide data associated with a vehicle activity determination. For instance, the GUI notification 302 is rendered on a computing device (e.g., mobile computing device) of a user that is a driver (or passenger) of a motor vehicle in which the vehicle activity determination is rendered for. The GUI notification 302 is automatically generated and rendered based on analysis of exemplary signal data described herein including signal data (e.g., activity signal data) associated with a mobile computing device that in onboard a vehicle. As shown in processing device view 300, GUI notification 302 is automatically rendered as a short message service (SMS) message through an OS of a mobile computing device. It is to be recognized that an exemplary GUI notification 302 can be provided through alternative modalities including but not limited to: email, application/service GUI notification; audio signal (e.g., via a bot such as that of a personal digital assistant); and any combination thereof, among other examples.

As previously referenced, GUI notification 302 comprises data associated with an activity determination of a vehicle (vehicle activity determination). Non-limiting examples of data associated with an exemplary activity determination comprise but are not limited to: one or more vehicle activity determinations; rationale/reasons for a predicted activity determination (e.g., why the motor vehicle is stopped on a specific road); data insights providing contextual information/specifics about an activity determination; and pertinent signal data (e.g., speed, velocity, braking, accelerometer, gyroscope, magnetometer) that is used to generate activity determination and recommendation actions pertaining to the activity determination (e.g., tips, suggestions, helpful links, GUI elements that trigger automatic action such as initiation of communications with other users, calling emergency services, roadside assistance, etc.). Processing device view 300 illustrates the inclusion of exemplary data in GUI notification 302. For instance, GUI notification 302 comprises an indication 304 of an activity determination for a vehicle associated with a mobile computing device. The indication 304 of an activity determination identifies a prediction that the user/vehicle may have been pulled over while driving on a highway ("Highway 9"). Additionally, GUI notification 302 comprises a rationale/reason 306 as to why (e.g., speeding) the user/vehicle may have been pulled over. In some alternative examples, signal data used by a trained model (e.g., trained AI model) may be identified as additional support/rationale for a prediction related to an activity determination. For instance, a GUI notification 302 may comprise identification of specific signals that were found useful to support the prediction that the user/vehicle is pulled over for speeding. In the example shown, the indication 304 of an activity determination further provides a link to the exact location (e.g., "Highway 9") that the user is stopped. This can provide a reference point for contextual recall for the user and/or other users that may receive GUI notification 302.

Exemplary GUI notification 302 further comprises recommendation content 308 providing one or more recommendations/suggestions for a user to consider taking action in response to the activity determination. In the example shown, recommendation content 308 comprises tips for the user to consider in response to being pulled over by law enforcement. For instance, recommendation content 308 provides a tip identifying that the license and registration are in the glovebox of the users' motor vehicle. This may be a general tip for the user or may alternatively be based on contextual information gathered from a driving safety application/service. For instance, a new driver's parent may have loaded pertinent information about the license and registration in the driving safety application/service, which can then be recalled for the new driver in a time of need. Additionally, GUI notification 302 provides selectable GUI features 310 and 312, that respectively automatically initiate communications on behalf of the user. For instance, a first selectable GUI feature 310 provides a link, that when selected, is configured to automatically initiate a communication with an emergency contact of the user. For instance, an emergency contact may be a new drivers' parent, where the user can automatically initiate communication with the emergency contact via the GUI notification 302. Additionally, a second selectable GUI feature 312 is presented. The second selectable GUI feature 312 provides a link, that when selected, is configured to automatically initiate a live stream between a user and one or more other users. This functionality is extremely helpful providing support when a driver is pulled over (e.g., interacting with law enforcement) as well as in need of assistance to due to accidents, car trouble (e.g., flat tire, out of gas or electrical charge), etc.

Figure 3B:
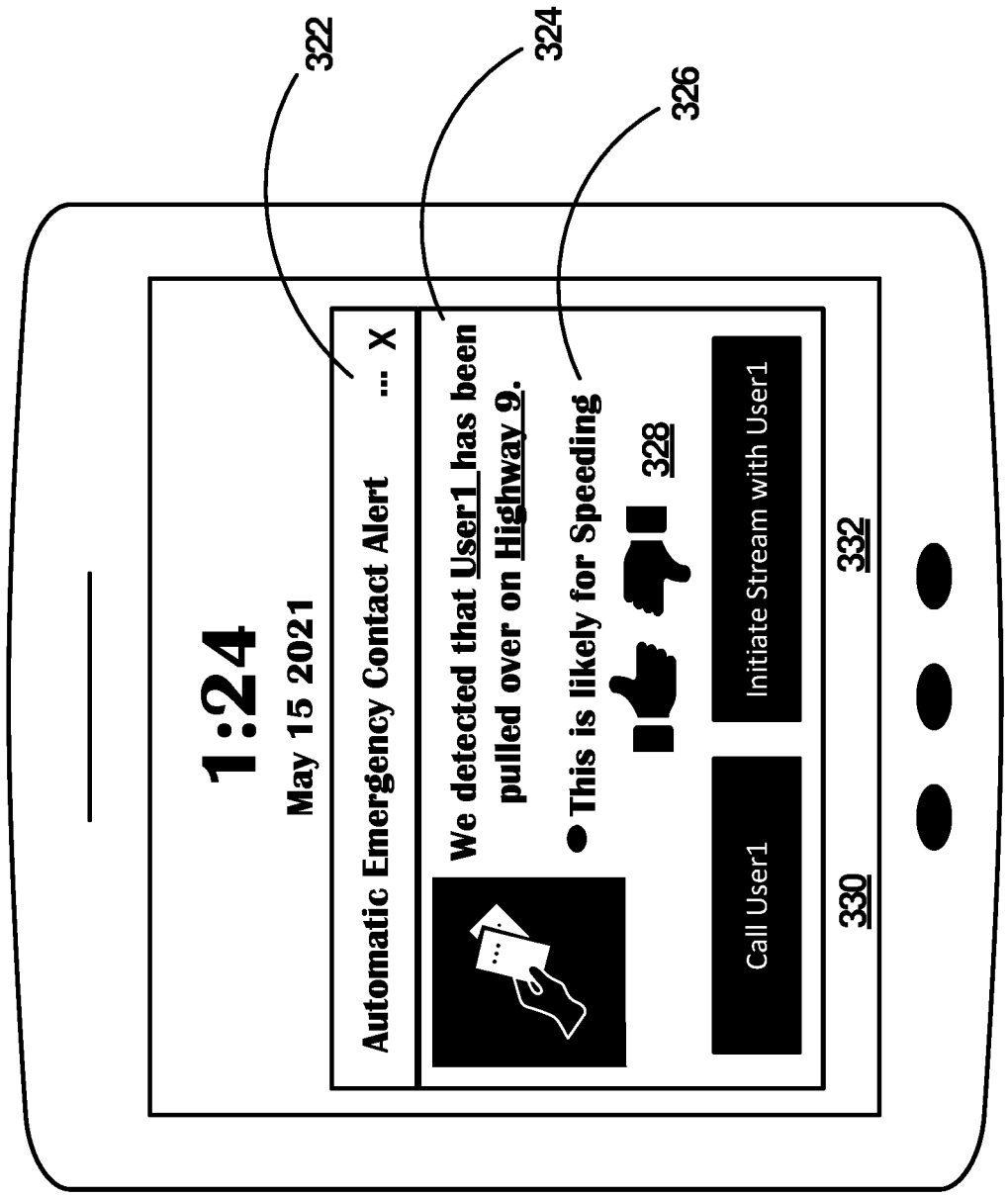

FIG. 3B presents processing device view 310, illustrating a continued example (or alternative example) of FIG. 3A. In one technical instance, processing device view 310 is described as a continued example of FIG. 3A when a GUI notification 322 is sent to another user (e.g., an emergency contact), via a computing device of that other user, in addition to rendering of GUI notification 302 (FIG. 3A) for the first user (described in FIG. 3A). In another technical instance processing device view 310 is described as an alternative example to FIG. 3A when a GUI notification 322 is sent directly to another user (e.g., an emergency contact) rather than the first user described in FIG. 3A. For instance, the other user may be a parent of a new driver and not in the car with their child but receive an automatic emergency contact alert.

In any example of processing device view 320, GUI notification 322 may be similar to the GUI notification 302 (FIG. 3A). For instance, GUI notification 322 comprises an indication 324 of an activity determination for a vehicle associated with a mobile computing device (e.g., of the first user that is an occupant of the vehicle). The indication 324 of an activity determination identifies a prediction that the other user ("User 1") may have been pulled over while driving on a highway ("Highway 9"). Additionally, GUI notification 322 comprises a rationale/reason 326 as to why (e.g., speeding) "User 1" may have been pulled over. In the example shown, the indication 324 of an activity determination further provides a link to the exact location (e.g., "Highway 9") that the user is stopped as well as link to the profile of "User 1" (e.g., in a driving safety application/service).

Moreover, GUI notification 322 further comprises GUI elements 328 that are configured to enable a user to provide feedback pertaining to the GUI notification 322. For instance, a user can select to like (thumbs up) or dislike (thumbs down) the GUI notification 322. This decision may occur based on the accuracy of the GUI notification 322 (e.g., the activity determination of a vehicle) and/or the accompanying data provided in the GUI notification 322. In some further examples, GUI elements (not shown) may be provided to enable users to provide additional contextual information. For instance, a fill-in GUI element may be presented to enable users to provide comments in freeform. Other types of modalities for providing user feedback, as known to one skilled in the field of art, can also be incorporated in the spirit of the present disclosure.

Additionally, GUI notification 322 provides selectable GUI features 330 and 322, that respectively automatically initiate communications on behalf of the user. For instance, a first selectable GUI feature 330 provides a link, that when selected, is configured to automatically initiate a communication with the first user ("User 1"). For instance, an emergency contact may be a new drivers' parent, where the parent can automatically initiate communication with the new driver via the GUI notification 322. Additionally, a second selectable GUI feature 332 is presented. The second selectable GUI feature 332 provides a link, that when selected, is configured to automatically initiate a live stream between the first user ("User 1") and one or more other users (e.g., the emergency contact). As indicated in the foregoing, this functionality is extremely helpful providing support when a driver is pulled over (e.g., interacting with law enforcement) as well as in need of assistance to due to accidents, car trouble (e.g., flat tire, out of gas or electrical charge), etc.

Figure 3C:
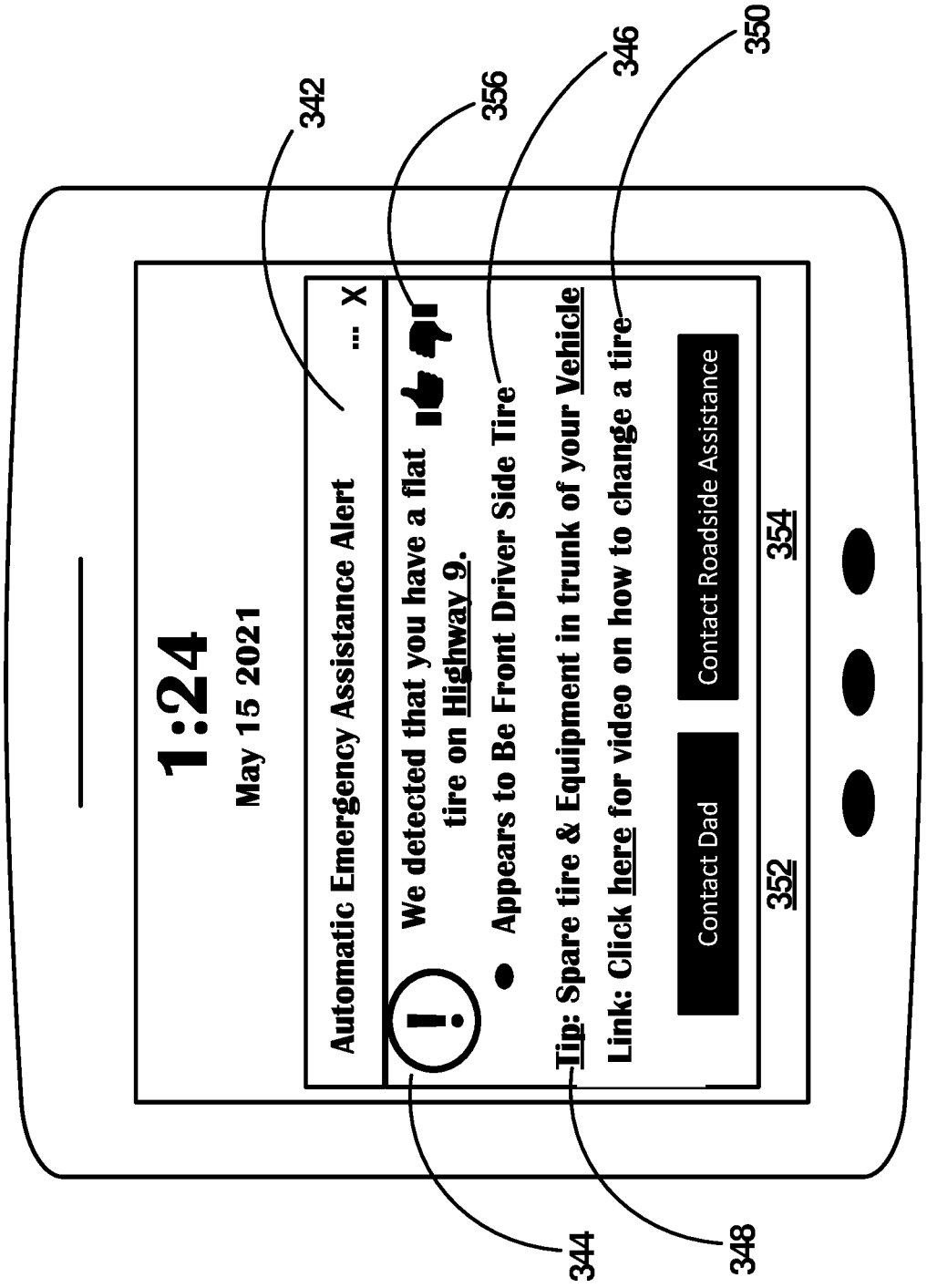
Figure 3D:
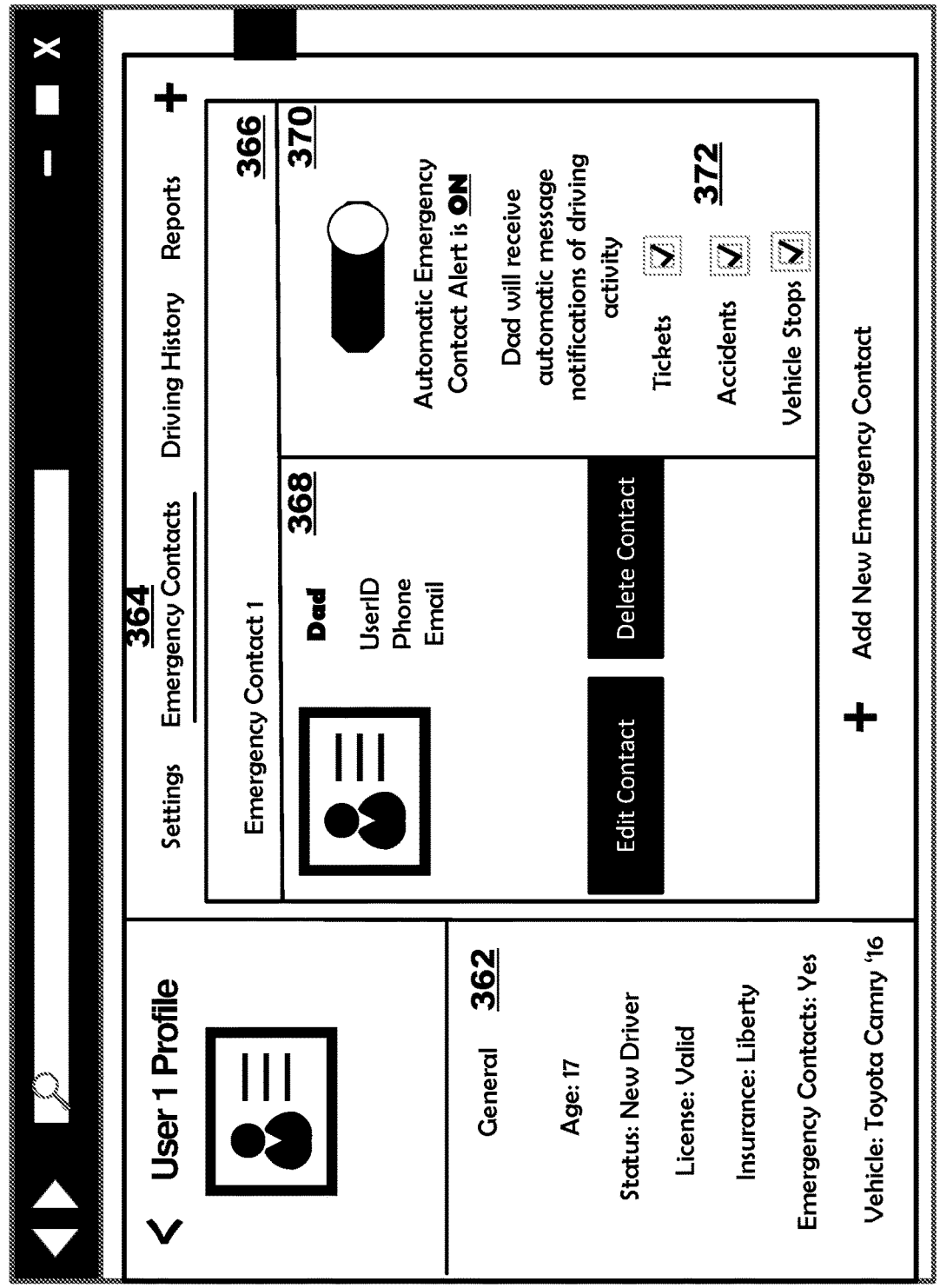
Figure 3E:
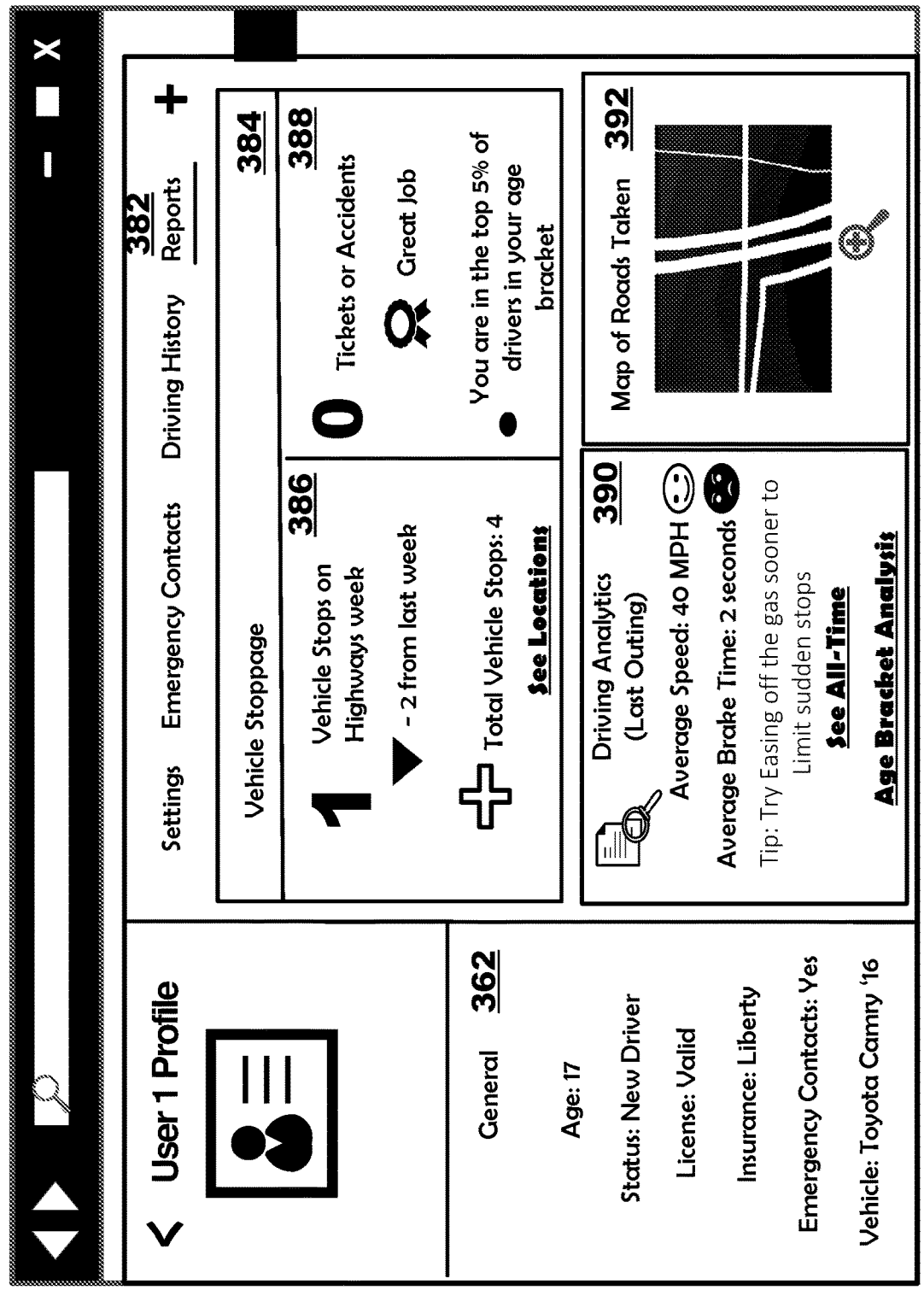

FIG. 3C presents processing device view 340, illustrating another example of a GUI notification 342 adapted to provide data associated with an activity determination for a vehicle (e.g., car being driven by a user). In the example shown in processing device view 340, the GUI notification 342 comprises an indication 344 of an activity determination for a vehicle associated with a mobile computing device. The indication 344 of an activity determination identifies a prediction that vehicle may have experienced a flat tire resulting in the vehicle being pulled over while driving on a highway ("Highway 9"). Additionally, GUI notification 342 comprises a data insight 346 providing specific contextual information or specific related to the activity determination. For instance, analyzing activity signal data, including sensor data associated with a mobile computing device that is traveling onboard a vehicle, may be analyzed to determine the specific tire that is compromised. In some alternative examples, a computing device may be integrated within a vehicle, where vehicle sensors (e.g., tire pressure sensor) can be used to determine a vehicle activity determination and/or data insights pertaining thereto.

Exemplary GUI notification 342 further comprises examples of recommendation content, respectively labeled 348 and 350, providing one or more recommendations/suggestions for a user to consider taking action in response to the activity determination. In the example shown, first recommendation content 348 comprises a tip for the user to consider in response to detection of a flat tire. For instance, the first recommendation content 348 provides a tip identifying a location of the spare tire and equipment needed to change the flat tire. This information may be specific to the users' vehicle, which may have been linked to a profile of their driving safety user account and/or obtained from analysis of signal data associated with a vehicle. Furthermore, GUI notification 342 further comprises second recommendation content 350 providing a link to contextually relevant content (e.g., how to change a flat tire). Understanding the context of the user (e.g., are they are a new driver, have they changed a tire before, etc.) can help customize GUI notifications for different users. As an example, a trained model (e.g., trained AI model) is linked to a plurality of knowledge repositories 110 (FIG. 1) via a network connection, where contextually relevant data (e.g., links) can be retrieved and presented to a user. This improves processing efficiency, as well as effectiveness of GUI notifications, so that a user does not have to execute numerous manual processing actions to track down content in a real-time emergency.

Additionally, GUI notification 332 provides selectable GUI features 352 and 354, that respectively automatically initiate communications on behalf of the user. For instance, a first selectable GUI feature 520 provides a link, that when selected, is configured to automatically initiate a communication with an emergency contact (e.g., "Dad") of the user. For instance, an emergency contact may be a new drivers' parent ("Dad"), where the user can automatically initiate communication with the emergency contact via the GUI notification 342. Additionally, a second selectable GUI feature 354 is presented. The second selectable GUI feature 354 provides a link, that when selected, is configured to automatically initiate a communication with roadside assistance. This may be useful to improve processing efficiency when connecting a user with roadside assistance. Similar to other contextual examples, this type of information may be obtained from analyzing signal data (e.g., user profile of a driving safety application/service).

FIG. 3D presents processing device view 360, illustrating an example of a GUI of a driving safety application/service. A user may create a user profile in a driving safety application/service (or other type of host application/service), where contextual data (e.g., user-specific, device-specific, vehicle-specific, application-specific) may be managed for the creation of exemplary GUI notifications comprising activity determinations of a vehicle. An exemplary driving safety application/service is adapted to handle any facets of driving safety including but not limited to management of: profile information; settings (including settings of automatic notifications); emergency contacts; driving history; driving patterns; reports (including comprehensive summary reporting pertaining to vehicle operation); driving education and learning; and compliance with driving laws and policies (e.g., license, insurance, registration), among other examples. Additional aspects of driving safety are known to one skilled in the field of art, where an exemplary driving safety application/service of the present disclosure may be adapted to include any such content.

In the example shown in processing device view 360, a user profile of a user ("User 1") is illustrated. The presentation of the user profile, in a GUI of the driving safety application/service, comprises general tab 362 providing general contextual data associated with the user profile ("User 1"). For instance, general contextual data comprises but is not limited to: the age of the user; the driving status (e.g., new driver; experienced driver); status of driver license; status of insurance (including insurer and/or policy information); emergency contact designations; vehicle description (e.g., make and model); vehicle characteristics (e.g., user input as to location of equipment, license, registration, etc.); and user preferences, among other examples. This type of data can be accessed by a trained model (e.g., trained machine learning model) to generate data insights including content suggestions/recommendations.

Furthermore, processing device view 360 illustrates the presentation of emergency contacts associated with the user profile ("User 1"). For instance, a user is accessing an Emergency Contacts tab 364 providing viewing access to stored emergency contacts associated with a user profile. An emergency contact may be a user that receives notifications of vehicle activity determinations, where users have control over who to send notifications to and/or other users can require that notifications be sent based on activity by a user (e.g., "User 1"). Processing device view 360 illustrates the presentation of "Emergency Contact 1" 366 providing an example of an emergency contact. In the example shown, "Emergency Contact 1" 366 provides contextual information 368 about the emergency contact ("Dad"). Users also have control over editing/modifying "Emergency Contact 1" 366 and/or adding new emergency contacts. Furthermore, in some examples, notifications associated with an emergency contact ("Emergency Contact 1" 366) can be toggled directly through a GUI of a driving safety application/service. For example, a user can control toggle control over a GUI feature 370 configured to control automated notifications that can be provided to other users (e.g., "Emergency Contact 1" 366) through an adapted GUI. This enables users to control whether "Emergency Contact 1" 366 to receives automatic message notifications pertaining to vehicle activity determinations. In further examples, a GUI of a driving safety application/service is adapted to enable users to toggle control over specific types of notifications that are provided to other users. For instance, GUI features 372 are illustrated in FIG. 3D that enable users to toggle control over specific types of vehicle activity determinations (e.g., Tickets, Accidents, Vehicle Stops). This functionality further fosters customization of vehicle activity notifications, thereby improving processing efficiency and usability of a driving safety application/service.

FIG. 3E presents processing device view 380, illustrating a continued example of a GUI of a driving safety application/service. In the example shown in processing device view 380, a user is viewing a Reports tab 382, which provides summary report information for a user profile ("User 1") pertaining to vehicle activity determinations. For instance, a customized GUI menu 384 is presented to detail a history of vehicle stoppage during operation of vehicles by "User 1". Within GUI menu 384, a first GUI feature 386 is presented that details a history of vehicle stops by a user ("User 1"). For instance, first GUI feature 386 provides a temporal representation of vehicle stoppage by a user (e.g., over a week), where it should be recognized that any time period can be selected to represent a report. First GUI feature 386 further comprises comparative analytics (e.g., over a temporal representation) for a user to gauge vehicle activity over time. Additionally, first GUI feature 386 further provides a link that is configured to take a user to a representation of prior vehicle stops and associated locations. This functionality can aid user recall of vehicle activities. Additionally, GUI menu 384, comprises a second GUI feature 388 detailing user activity pertaining to accidents. The second GUI feature 388 illustrated is just one non-limiting example, where any other types of activity determinations (e.g., tickets, being pulled over, missing exits, etc.) can also be represented in a similar GUI feature. In the example shown in processing device view 380, the second GUI feature 388 provides analytics, as applied to an activity determination, that enables user to contextually understand how well they are doing with driving safety. Additionally, comparative analytics may also be presented including comparisons of vehicle activity compared to other users (e.g., other users within their age bracket).

Moreover, processing device view 380 further illustrates the presentation of additional GUI features within summary reporting. For instance, a driving analytics GUI feature 390 is presented provided users with driving analytics pertaining to their vehicle activity. Driving analytics may be presented over a specific temporal representation and/or an entirety of a users' driving history. Additionally, a trained model (e.g., trained AI model) is adapted to generate data insights and/or suggestions/recommendations pertaining to analysis of a users' driving analytics, which can further be presented in driving analytics GUI feature 390. Further, links to additional analytical reporting (e.g., "All-Time" driving analytics and "Age Bracket Analysis") are also provided within GUI menu 384, driving analytics GUI feature to further provide a comprehensive contextual analysis. Processing device view 380 further illustrates the presentation of a mapping analytics GUI feature 392. An exemplary mapping analytics GUI feature 392 is configured to highlight locational driving patterns of a user and further provide context for generation of exemplary GUI notifications pertaining to specific roads (e.g., highways) taken by a user. Users can drill into various levels of detail pertaining to their driving patterns (locational) to better understand driving behaviors, road hazards, etc.

FIG. 4 illustrates a computing system 401 suitable for implementing processing operations described herein related to generation and management of activity determinations of a vehicle and provision of associated GUI notifications, with which aspects of the present disclosure may be practiced. As referenced above, computing system 401 may be configured to implement processing operations of any component described herein including an exemplary vehicle activity management component (106 of FIG. 1). As such, computing system 401 may be configured as a specific purpose computing device that executes specific processing operations to solve the technical problems described herein including those pertaining to generation of notifications of vehicle activity including emergency notifications (e.g., associated with a stopped vehicle). Computing system 401 may be implemented as a single apparatus, system, or device or may be implemented in a distributed manner as multiple apparatuses, systems, or devices. For example, computing system 401 may comprise one or more computing devices that execute processing for applications and/or services over a distributed network to enable execution of processing operations described herein over one or more applications or services. Computing system 401 may comprise a collection of devices executing processing for front-end applications/services, back-end applications/services or a combination thereof. Computing system 401 comprises, but is not limited to, a processing system 402, a storage system 403, software 405, communication interface system 407, and user interface system 409. Processing system 402 is operatively coupled with storage system 403, communication interface system 407, and user interface system 409. Non-limiting examples of computer system 401 comprise but are not limited to: smart phones, laptops, tablets, PDAs, desktop computers, servers, smart computing devices including television devices and wearable computing devices including VR devices and AR devices, e-reader devices, gaming consoles, vehicle computing systems/devices, and conferencing systems, among other non-limiting examples.

Processing system 402 loads and executes software 405 from storage system 403. Software 405 includes one or more software components (e.g., 406a and 406b) that are configured to enable functionality described herein. In some examples, computing system 401 may be connected to other computing devices (e.g., display device, audio devices, servers, mobile/remote devices, VR devices, AR devices, etc.) to further enable processing operations to be executed. When executed by processing system 402, software 405 directs processing system 402 to operate as described herein for at least the various processes, operational scenarios, and sequences discussed in the foregoing implementations. Computing system 401 may optionally include additional devices, features, or functionality not discussed for purposes of brevity. Computing system 401 may further be utilized to execute system diagram 100 (FIG. 1), method 200 (FIG. 2), and/or the accompanying description of FIGS. 3A-3E.

Referring still to FIG. 4, processing system 402 may comprise processor, a micro-processor and other circuitry that retrieves and executes software 405 from storage system 403. Processing system 402 may be implemented within a single processing device but may also be distributed across multiple processing devices or sub-systems that cooperate in executing program instructions. Examples of processing system 402 include general purpose central processing units, microprocessors, graphical processing units, application specific processors, sound cards, speakers and logic devices, gaming devices, VR devices, AR devices, vehicle computing devices as well as any other type of processing devices, combinations, or variations thereof.

Storage system 403 may comprise any computer readable storage media readable by processing system 402 and capable of storing software 405. Storage system 403 may include volatile and nonvolatile, removable, and non-removable media implemented in any method or technology for storage of information, such as computer readable instructions, data structures, program modules, cache memory or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations storage system 403 may also include computer readable communication media over which at least some of software 405 may be communicated internally or externally. Storage system 403 may be implemented as a single storage device but may also be implemented across multiple storage devices or sub-systems co-located or distributed relative to each other. Storage system 403 may comprise additional elements, such as a controller, capable of communicating with processing system 402 or possibly other systems.

Software 405 may be implemented in program instructions and among other functions may, when executed by processing system 402, direct processing system 402 to operate as described with respect to the various operational scenarios, sequences, and processes illustrated herein. For example, software 405 may include program instructions for executing one or more vehicle activity management component(s) 406a as described herein. Software 405 may further comprise application/service component(s) 406b that provide applications/services as described in the foregoing description such as applications/services that enable access to presentation content (and templates thereof) including slide-based presentation applications/services and collaborative communication applications/services usable to enable users to conduct electronic meetings, among other examples.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 405 may include additional processes, programs, or components, such as operating system software, virtual machine software, or other application software. Software 405 may also comprise firmware or some other form of machine-readable processing instructions executable by processing system 402.

In general, software 405 may, when loaded into processing system 402 and executed, transform a suitable apparatus, system, or device (of which computing system 401 is representative) overall from a general-purpose computing system into a special-purpose computing system customized to execute specific processing components described herein as well as process data and respond to queries. Indeed, encoding software 405 on storage system 403 may transform the physical structure of storage system 403. The specific transformation of the physical structure may depend on various factors in different implementations of this description. Examples of such factors may include, but are not limited to, the technology used to implement the storage media of storage system 403 and whether the computer-storage media are characterized as primary or secondary storage, as well as other factors.

For example, if the computer readable storage media are implemented as semiconductor-based memory, software 405 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 407 may include communication connections and devices that allow for communication with other computing systems (not shown) over communication networks (not shown). Communication interface system 407 may also be utilized to cover interfacing between processing components described herein. Examples of connections and devices that together allow for inter-system communication may include network interface cards or devices, antennas, satellites, power amplifiers, RF circuitry, transceivers, and other communication circuitry. The connections and devices may communicate over communication media to exchange communications with other computing systems or networks of systems, such as metal, glass, air, or any other suitable communication media. The media, connections, and devices are well known and need not be discussed at length here.

User interface system 409 is optional and may include a keyboard, a mouse, a voice input device, a touch input device for receiving a touch gesture from a user, a motion input device for detecting non-touch gestures and other motions by a user, gaming accessories (e.g., controllers and/or headsets) and other comparable input devices and associated processing elements capable of receiving user input from a user. Output devices such as a display, speakers, haptic devices, and other types of output devices may also be included in user interface system 409. In some cases, the input and output devices may be combined in a single device, such as a display capable of displaying images and receiving touch gestures. The aforementioned user input and output devices are well known in the art and need not be discussed at length here.

User interface system 409 may also include associated user interface software executable by processing system 402 in support of the various user input and output devices discussed above. Separately or in conjunction with each other and other hardware and software elements, the user interface software and user interface devices may support a graphical user interface, a natural user interface, or any other type of user interface, for example, that enables front-end processing of exemplary application/services described herein including rendering of: exemplary GUI notifications associated with vehicle activity determinations (and associated data); GUI features/elements included within GUI notifications including links/interactive content; GUI elements (including GUI menus) and application command control features configured to enable management of exemplary GUI notifications; management of data insights associated with activity determinations for a vehicle including data insight suggestions and/or recommendations including automatic task-based execution; rendering and synchronization of GUI notifications across different host application/service endpoints including those associated with different user accounts; and rendering of a GUI of an application/service adapted for driving safety including adapted GUI features that enable control over automatic notification of vehicle activity determinations, among other examples. User interface system 409 comprises a graphical user interface that presents graphical user interface elements representative of any point in the processing described in the foregoing description including processing operations described in system diagram 100 (FIG. 1), method 200 (FIG. 2), and front-end representations related to the description of FIGS. 3A-3E. A graphical user interface of user interface system 409 may further be configured to display graphical user interface elements (e.g., data fields, menus, links, graphs, charts, data correlation representations and identifiers, etc.) that are representations generated from processing described in the foregoing description. Exemplary applications/services may further be configured to interface with processing components of computing device 401 that enable output of other types of signals (e.g., audio output, handwritten input) in conjunction with operation of exemplary applications/services (e.g., a collaborative communication application/service, electronic meeting application/service, etc.) described herein.

Communication between computing system 401 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), Bluetooth, infrared, RF, cellular networks, satellite networks, global positioning systems, as well as any other suitable communication protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

Some non-limiting examples of the present disclosure describe systems and/or method for managing automated notifications of reboot estimates relative to updates to be applied to a computing device. For instance, a computer-implemented method may be executed across at least one computing device, including a system, to accomplish processing described herein.

One non-limiting example of the present disclosure pertains to automatic generation and rendering of a GUI notification that comprises an activity determination predicting why a motor vehicle is stopped, for example, on a highway. Activity signal data, comprising location data and motion activity data, is detected from a mobile computing device. The motion activity data comprises: signal data of the mobile computing device received from different sensors associated with the mobile computing device including: an accelerometer; a gyroscope; a magnetometer; and a combination thereof. In further examples, the activity signal data comprises signal data indicating a state of operation of the mobile computing device such as whether the mobile computing device is in an idle state. Other types of signal data described herein are also includable in activity signal data. Analysis of the activity signal data yields a determination that the mobile computing device is onboard a vehicle (e.g., motor vehicle). The activity signal data is further analyzed to determine that the vehicle (e.g., motor vehicle) is stopped, for example, on a specific type of road. A trained model (e.g., trained AI model) is applied, where the trained model is adapted to generate confidence scoring for generation of one or more activity determinations predicting why the motor vehicle is stopped. Exemplary confidence scoring is generated based on a contextual analysis that comprises an evaluation of the activity signal data. The contextual analysis derives parameters to generate confidence scoring. For example, confidence scoring is generated based on analysis of two or more of: driving behavior of the motor vehicle prior to the motor vehicle being stopped; a determination as to a type of road, of the specific road, that the motor vehicle is stopped on; an evaluation of traffic information associated with a specific road (e.g., highway) that the motor vehicle is stopped on; an evaluation of historical driving patterns associated with a user of the mobile computing device relative to roads traveled/taken; and an evaluation of historical driving behaviors associated with the user of the mobile computing device, among other types of data.

In one example, an exemplary contextual analysis further comprises an evaluation of historical driving patterns associated with a user of the mobile computing device relative to roads taken/traveled (e.g., historically). This type of historical analysis focuses on locational/navigational history of a user. That is, a determination as to the type of road that the motor vehicle is stopped on is further determined based on analysis of the historical driving patterns as well as an analysis of the activity signal data (current). Historical driving patterns can further be used as a false positive determination of trained model, where historical driving patterns can determine if a user typically stops on a specific road (e.g., to get gas or coffee) which may be an indication that an emergency notification may not need to be sent. Additionally, historical driving patterns pertaining to driving behaviors of a user can also be analyzed and utilized for aiding contextual analysis. For instance, a determination as to the driving behavior of the motor vehicle prior to the motor vehicle being stopped is further determined based on analysis of data of historical driving behaviors associated with historical driving behaviors of the user of the mobile computing device as well as the activity signal data (current). This can help minimize false positives, when previous driving behaviors suggest against an emergency, as well as help determine if a ticket, accident, flat tire, etc., is likely to have occurred based on historical patterns of a driver.

Continuing the above example, application of a trained model selects an activity determination, from the one or more activity determinations associated with the vehicle, that indicates a prediction as to why the vehicle (e.g., motor vehicle) is stopped on a road based on a result of analyzing the confidence scoring. For instance, a threshold may be applied to select N number of predictions (e.g., one or more activity determinations) based on a result of analysis of specific confidence scores associated with individual activity determinations. In one example, an activity determination having a highest confidence score is selected for output. A GUI notification is automatically generated that comprises data associated with the activity determination indicating a prediction as to why the vehicle (e.g., motor vehicle) is stopped. In some examples, the GUI notification is automatically rendered via the mobile computing device. In distributed examples where analysis occurs via a different computing device (e.g., server device) from that which the GUI notification is to be provided, data for rendering the GUI notification is transmitted to the mobile computing device. In further examples, an GUI notification is automatically transmitted to (and subsequently rendered via) another computing device. For instance, an emergency contact (e.g., parent, guardian, friend) receives a GUI notification of activity of the motor vehicle.

An exemplary GUI notification efficiently provides contextual data pertaining to an activity determination including but not limited to: one or more activity determinations; rationale/reasons for a predicted activity determination (e.g., why the motor vehicle is stopped on a specific road); pertinent signal data (e.g., speed, velocity, braking, accelerometer, gyroscope, magnetometer) that is used to generate activity determination and recommendation actions pertaining to the activity determination (e.g., tips, suggestions, helpful links, GUI elements that trigger automatic action such as initiation of communications with other users, calling emergency services, roadside assistance, etc.). In one example, a live stream between a user and one or more other users can be automatically initiated through a selection of a GUI element of an exemplary GUI notification providing an activity determination of a vehicle. This is extremely helpful providing support when a driver is pulled over (e.g., interacting with law enforcement) as well as in need of assistance to due to accidents, car trouble (e.g., flat tire, out of gas or electrical charge), etc.

Reference has been made throughout this specification to "one example," "exemplary" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A computer-implemented method comprising:
   detecting, from a mobile computing device, activity signal data comprising locational data and motion activity data, wherein the locational data and motion activity data are obtained from available sensors of a plurality of sensors associated with the mobile computing device;
   analyzing the activity signal data, the analyzing comprising determining one or more of a speed, a velocity, a stopping distance, a change of direction, and a distance traveled over a specified period of time;
   determining that mobile computing device is onboard a motor vehicle based at least in part on the analyzing the activity signal data;
   determining that the motor vehicle is stopped on a specific road based at least in part on the analyzing the activity signal data;
   adjusting an artificial intelligence (AI) model in real-time based on the available sensors;
   generating, with the adjusted AI model, confidence scoring for one or more activity determinations, each providing a prediction as to why the motor vehicle is stopped, based on a contextual analysis that comprises an evaluation of the activity signal data, wherein the contextual analysis derives:
      driving behavior of the motor vehicle prior to the motor vehicle being stopped, and a determination as to a type of road, of the specific road, that the motor vehicle is stopped on;

selecting an activity determination, from the one or more activity determinations, indicating a prediction as to why the motor vehicle is stopped based on a result of analyzing the confidence scoring;

automatically generating a graphical user interface (GUI) notification that comprises data associated with the activity determination indicating a prediction as to why the motor vehicle is stopped; and automatically rendering the GUI notification via the mobile computing device.

2. The computer-implemented method of claim 1, wherein the determination as to a type of road that the motor vehicle is stopped on is a prediction that the user is on a highway.

3. The computer-implemented method of claim 2, wherein the contextual analysis further comprises an evaluation of traffic information associated with highway.

4. The computer-implemented method of claim 1, wherein the contextual analysis further comprises an evaluation of historical driving patterns associated with a user of the mobile computing device relative to roads taken, and wherein the determination as to the type of road that the motor vehicle is stopped on is further determined based on analysis of the historical driving patterns and the activity signal data.

5. The computer-implemented method of claim 1, wherein the contextual analysis further comprises an evaluation of historical driving behaviors associated with a user of the mobile computing device, and wherein the determination as to the driving behavior of the motor vehicle prior to the motor vehicle being stopped is further determined based on analysis of data of historical driving behaviors associated with a user of the mobile computing device and the activity signal data.

6. The computer-implemented method of claim 1, wherein the activity signal data further comprises signal data indicating whether the mobile computing device is in an idle state.

7. The computer-implemented method of claim 1, wherein the generating of the GUI notification further comprises automatically generating a recommendation action for the activity determination, and wherein the recommendation action is included in the GUI notification rendered via the mobile computing device.

8. The computer-implemented method of claim 7, wherein the recommendation action comprises a GUI element to automatically initiate communication with one or more other users.

9. The computer-implemented method of claim 1, wherein the motion activity data comprises signal data of the mobile computing device received from one or more of an accelerometer, a gyroscope, and a magnetometer.

10. A computer-implemented method comprising:

receiving, from a mobile computing device, activity signal data comprising locational data and motion activity data, wherein the locational data and motion activity data are obtained from available sensors of a plurality of sensors associated with the mobile computing device;

analyzing the activity signal data, the analyzing comprising determining one or more of a speed, a velocity, a stopping distance, a change of direction, and a distance traveled over a specified period of time;

determining that mobile computing device is onboard a motor vehicle based at least in part on the analyzing the activity signal data;

determining that the motor vehicle is stopped on a specific road based at least in part on the analyzing the activity signal data;

adjusting an artificial intelligence (AI) model in real-time based on the available sensors;

generating, with the adjusted AI model, confidence scoring for one or more activity determinations, each providing a prediction as to why the motor vehicle is stopped, based on a contextual analysis that comprises an evaluation of the activity signal data, wherein the contextual analysis derives:

driving behavior of the motor vehicle prior to the motor vehicle being stopped, and a determination as to a type of road, of the specific road, that the motor vehicle is stopped on;

selecting an activity determination, from the one or more activity determinations, indicating a prediction as to why the motor vehicle is stopped based on a result of analyzing the confidence scoring;

automatically generating a graphical user interface (GUI) notification that comprises data associated with the activity determination indicating a prediction as to why the motor vehicle is stopped; and automatically transmitting, to the mobile computing device, data for rendering the GUI notification.

11. The computer-implemented method of claim 10, wherein the determination as to a type of road that the motor vehicle is stopped on is a prediction that the user is on a highway.

12. The computer-implemented method of claim 11, wherein the contextual analysis further comprises an evaluation of traffic information associated with highway.

13. The computer-implemented method of claim 10, wherein the contextual analysis further comprises an evaluation of historical driving patterns associated with a user of the mobile computing device relative to roads taken, and wherein the determination as to the type of road that the motor vehicle is stopped on is further determined based on analysis of the historical driving patterns and the activity signal data.

14. The computer-implemented method of claim 10, wherein the contextual analysis further comprises an evaluation of historical driving behaviors associated with a user of the mobile computing device, and wherein the determination as to the driving behavior of the motor vehicle prior to the motor vehicle being stopped is further determined based on analysis of data of historical driving behaviors associated with a user of the mobile computing device and the activity signal data.

15. The computer-implemented method of claim 10, wherein the activity signal data further comprises signal data indicating whether the mobile computing device is in an idle state.

16. The computer-implemented method of claim 10, wherein the generating of the GUI notification further comprises automatically generating a recommendation action for the activity determination, and wherein the recommendation action is included in the data for rendering the GUI notification.

17. The computer-implemented method of claim 16, wherein the recommendation action comprises a GUI element to automatically initiate communication with one or more other users.

18. A computer-implemented method comprising:
accessing activity signal data comprising locational data and motion activity data of a mobile computing device, wherein the locational data and motion activity data are obtained from available sensors of a plurality of sensors associated with the mobile computing device;
analyzing the activity signal data, the analyzing comprising determining one or more of a speed, a velocity, a stopping distance, a change of direction, and a distance traveled over a specified period of time;
determining that mobile computing device is onboard a motor vehicle based at least in part on the analyzing the activity signal data;
determining that the motor vehicle is stopped on a specific road based at least in part on the analyzing the activity signal data;
adjusting an artificial intelligence (AI) model in real-time based on the available sensors;
generating, with the adjusted AI model, confidence scoring for one or more activity determinations, each providing a prediction as to why the motor vehicle is stopped, based on a contextual analysis that comprises an evaluation of the activity signal data, wherein the contextual analysis derives:
   driving behavior of the motor vehicle prior to the motor vehicle being stopped, and
   a determination as to a type of road, of the specific road, that the motor vehicle is stopped on;
selecting an activity determination, from the one or more activity determinations, indicating a prediction as to why the motor vehicle is stopped based on a result of analyzing the confidence scoring;
automatically generating a graphical user interface (GUI) notification that comprises data associated with the activity determination indicating a prediction as to why the motor vehicle is stopped; and
automatically transmitting the GUI notification to one or more other computing devices.

19. The computer-implemented method of claim 18, wherein the generating of the GUI notification further comprises automatically generating a recommendation action for the activity determination, and wherein the recommendation action is included in the GUI notification transmitted to the one or more other computing devices.

20. The computer-implemented method of claim 19, wherein the recommendation action comprises a GUI element to automatically initiate communication with one or more of: a user of the mobile computing device, and an emergency service.

* * * * *